(12) United States Patent
Ma

(10) Patent No.: US 10,743,247 B2
(45) Date of Patent: Aug. 11, 2020

(54) NETWORK ACCESS CONTROL METHOD, APPARATUS, AND DEVICE

(71) Applicant: Huawei Technologies Co., Ltd., Shenzhen (CN)

(72) Inventor: Jingwang Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/379,394

(22) Filed: Apr. 9, 2019

(65) Prior Publication Data

US 2019/0239150 A1 Aug. 1, 2019

Related U.S. Application Data

(63) Continuation of application No. PCT/CN2016/101529, filed on Oct. 9, 2016.

(51) Int. Cl.
*H04W 48/18* (2009.01)
*H04W 48/16* (2009.01)
(Continued)

(52) U.S. Cl.
CPC ......... *H04W 48/16* (2013.01); *H04L 41/0893* (2013.01); *H04W 8/18* (2013.01);
(Continued)

(58) Field of Classification Search
None
See application file for complete search history.

(56) References Cited

U.S. PATENT DOCUMENTS

| 9,392,471 B1 | 7/2016 | Thomas et al. |
| 2004/0088419 A1 | 5/2004 | Westman |

(Continued)

FOREIGN PATENT DOCUMENTS

| CN | 103269282 A | 8/2013 |
| CN | 104253866 A | 12/2014 |

(Continued)

OTHER PUBLICATIONS

Machine Translation and Abstract of Chinese Publication No. CN105813195, dated Jul. 27, 2016, 24 pages.

(Continued)

*Primary Examiner* — Scott M Sciacca
(74) *Attorney, Agent, or Firm* — Conley Rose, P.C.

(57) ABSTRACT

The present application provides a network access control method, apparatus, and device. The method includes receiving a discovery request sent by a first network function (NF) instance, where the discovery request includes an identifier of a second PLMN and an NF type of a to-be-accessed NF instance. The method further includes obtaining a to-be-accessed network slice identifier, and requesting a second network function management module (NFRF) corresponding to the identifier of the second public land mobile network (PLMN) for instance information of a second NF instance corresponding to the NF type of the to-be-accessed NF instance and the to-be-accessed network slice identifier, and sending the instance information to the first NF instance, to improve access reliability of NF instances between different PLMNs.

20 Claims, 12 Drawing Sheets

(51) Int. Cl.

| | | |
|---|---|---|
| *H04W 48/08* | (2009.01) | |
| *H04W 76/00* | (2018.01) | |
| *H04W 12/08* | (2009.01) | |
| *H04W 8/18* | (2009.01) | |
| *H04W 76/11* | (2018.01) | |
| *H04L 12/24* | (2006.01) | |
| *H04W 48/00* | (2009.01) | |
| *H04W 60/00* | (2009.01) | |
| *H04W 48/14* | (2009.01) | |
| *H04W 84/04* | (2009.01) | |

(52) U.S. Cl.
CPC ........... *H04W 12/08* (2013.01); *H04W 48/17* (2013.01); *H04W 48/18* (2013.01); *H04W 60/00* (2013.01); *H04W 76/11* (2018.02); *H04W 48/14* (2013.01); *H04W 84/042* (2013.01)

(56) References Cited

U.S. PATENT DOCUMENTS

| | | |
|---|---|---|
| 2011/0149968 A1 | 6/2011 | Kim |
| 2014/0040450 A1 | 2/2014 | Sanneck et al. |
| 2016/0006623 A1 | 1/2016 | Liu et al. |
| 2016/0212017 A1 | 7/2016 | Li et al. |
| 2017/0070892 A1* | 3/2017 | Song .................... H04L 41/042 |
| 2017/0332421 A1* | 11/2017 | Sternberg ............ H04L 12/4641 |
| 2019/0238425 A1* | 8/2019 | Mladin ............... H04L 41/0806 |
| 2019/0239150 A1 | 8/2019 | Ma |
| 2020/0053802 A1* | 2/2020 | Li ....................... H04L 41/5041 |

FOREIGN PATENT DOCUMENTS

| | | |
|---|---|---|
| CN | 104811328 A | 7/2015 |
| CN | 105813195 A | 7/2016 |
| EP | 3509336 A1 | 7/2019 |
| RU | 2315436 C2 | 1/2008 |
| WO | 2015110083 A1 | 7/2015 |
| WO | 2015174989 A1 | 11/2015 |
| WO | 2018064824 A1 | 4/2018 |
| WO | 2018066977 A1 | 4/2018 |

OTHER PUBLICATIONS

"Progress overview on network slicing in SA1, SA2, NGMN and analysis of potential management related aspects," 3GPP TSG SA WG5 (Telecom Management) Meeting #109, Aug. 29-Sep. 2, 2016, S5-165210, 15 pages.

Foreign Communication From a Counterpart Application, PCT Application No. PCT/CN2016/101529, English Translation of International Search Report dated Jul. 6, 2017, 2 pages.

Foreign Communication From a Counterpart Application, PCT Application No. PCT/CN2016/101529, English Translation of Written Opinion dated Jul. 6, 2017, 5 pages.

Foreign Communication From a Counterpart Application, Russian Application No. 2019113932/08, Russian Decision of Grant dated Oct. 31, 2019, 21 pages.

Foreign Communication From a Counterpart Application, Russian Application No. 2019113932/08, English Translation of Russian Decision of Grant dated Oct. 31, 2019, 11 pages.

"3rd Generation Partnership Project; Technical Specification Group Services and System Aspects; Study on Architecture for Next Generation System (Release 14)," 3GPP TR 23.799, V0.6.0, Jul. 2016, 321 pages.

Foreign Communication From a Counterpart Application, European Application No. 16918158.3, Extended European Search Report dated Jul. 15, 2019, 12 pages.

"3rd Generation Partnership Project; Technical Specification Group Services and System Aspects; Study on Architecture for Next Generation System (Release 14)," 3GPP TR 23. 799, V1.0.0, Sep. 22, 2016, 7 pages.

Huawei, et al., "Supporting network slicing in roaming scenario," 3GPP TSG-SA WG2#116bis, S2-165385, Sep. 2, 2016, 10 pages.

* cited by examiner

US 10,743,247 B2

NETWORK ACCESS CONTROL METHOD, APPARATUS, AND DEVICE

CROSS-REFERENCE TO RELATED APPLICATIONS

This application is a continuation of International Patent Application No. PCT/CN2016/101529, filed on Oct. 9, 2016, the disclosure of which is hereby incorporated by reference in its entirety.

TECHNICAL FIELD

The present application relates to the field of communications technologies, and in particular, to a network access control method, apparatus, and device.

BACKGROUND

A public land mobile network (PLMN) is a network that is established and operated to provide a land mobile communications service for the public. To improve network communication efficiency and satisfy different communications service requirements, the PLMN may be divided into a plurality of network slices, and each network slice provides a corresponding network service.

One PLMN may include a plurality of network slices. A plurality of network function (NF) instances may be deployed in each network slice, and each NF instance may provide one type of network service for a user. When providing a cross-PLMN roaming service for a user (for example, a terminal device of a server provided by a Chinese operator is located in a foreign country), an NF instance in a PLMN may need to access a to-be-accessed NF instance in another PLMN. In other approaches, an NF instance in a PLMN can access an NF instance in another PLMN only based on an NF type of the to-be-accessed NF instance. However, when a network slice type to which the to-be-accessed NF instance belongs is different from a network slice type to which the NF instance belongs, the to-be-accessed NF instance may not include a network function, data, or the like needed by the NF instance. Consequently, the NF instance cannot access a correct to-be-accessed NF instance, resulting in relatively poor access reliability of NF instances between different PLMNs.

SUMMARY

Embodiments of the present application provide a network access control method, apparatus, and device, to improve access reliability of NF instances between different PLMNs.

According to a first aspect, an embodiment of the present application provides a network access control method. The method may include sending, by the first NF instance, a discovery request to a first network function management module (NFRF) when a first NF instance needs to access an NF instance of an NF type of a to-be-accessed NF instance in a second PLMN, where the discovery request includes an identifier of the second PLMN and the NF type of the to-be-accessed NF instance, obtaining, by the first NFRF, a to-be-accessed network slice identifier, and requesting a second NFRF in the second PLMN for instance information of a second NF instance corresponding to the NF type of the to-be-accessed NF instance and the to-be-accessed network slice identifier. The method may further include sending the instance information to the first NF instance, such that the first NF instance accesses the second NF instance based on the instance information.

In this application, the first NFRF is set for a first PLMN, and the first NFRF manages an NF instance in the first PLMN. The second NFRF is set for the second PLMN, and the second NFRF manages an NF instance in the second PLMN. In this way, when the first NF instance in the first PLMN needs to access the second NF instance in the second PLMN, the first NF instance may obtain the instance information of the second NF instance based on the first NFRF and the second NFRF, and access the second NF instance based on the instance information of the second NF instance, such that an NF instance in a PLMN can accurately access an NF instance in another PLMN, thereby improving access reliability of NF instances in different PLMNs.

In a possible implementation, optionally, when the first NFRF needs to obtain the instance information of the second NF instance, the first NFRF may obtain the to-be-accessed network slice identifier corresponding to the to-be-accessed NF instance, send an obtaining request to the second NFRF, where the obtaining request includes the NF type of the to-be-accessed NF instance and the to-be-accessed network slice identifier, and receive the instance information of the second NF instance corresponding to the NF type of the to-be-accessed NF instance and the to-be-accessed network slice identifier that are sent by the second NFRF.

In this possible implementation, optionally, the to-be-accessed network slice identifier is a type of a to-be-accessed network slice. Alternatively, the to-be-accessed network slice identifier is a combination of a type of a to-be-accessed network slice and a tenant identifier.

Optionally, the first NFRF may obtain the to-be-accessed network slice identifier corresponding to the to-be-accessed NF instance using the following two possible implementations.

In one possible implementation, the discovery request includes the to-be-accessed network slice identifier, and correspondingly, the first NFRF may obtain the to-be-accessed network slice identifier from the discovery request.

In this possible implementation, the first NF instance determines the to-be-accessed network slice identifier corresponding to the to-be-accessed NF instance, and adds the to-be-accessed network slice identifier to the discovery request, such that the first NFRF can quickly obtain the to-be-accessed network slice identifier.

In the other possible implementation, the first NFRF obtains a function type corresponding to the first NF instance, and determines the to-be-accessed network slice identifier based on the function type corresponding to the first NF instance.

Optionally, the first NFRF may obtain a first network slice type of a first network slice to which the first NF instance belongs; determine, based on the function type corresponding to the first NF instance, a second network slice type, in the second PLMN, that corresponds to the first network slice type; and determine the second network slice type as the to-be-accessed network slice identifier.

Optionally, if the function type corresponding to the first NF instance is a first function type, the first network slice type of the first network slice to which the first NF instance belongs is determined as the second network slice type, where a slice type of a network function corresponding to the first function type is the same in all PLMNs.

Optionally, if the function type corresponding to the first NF instance is a second function type, a policy management unit is requested for the second network slice type, where a slice type of a network function corresponding to the second function type is different in different PLMNs. Optionally, a slice type obtaining request may be sent to the policy management unit, where the network slice obtaining request includes the first network slice type and the identifier of the second PLMN. Additionally, the second network slice type, in the second PLMN, that is sent by the policy management unit and that corresponds to the first network slice type is received.

In this possible implementation, the first NFRF can accurately obtain the to-be-accessed network slice identifier corresponding to the to-be-accessed NF instance based on the function type corresponding to the first NF instance, thereby further improving the access reliability of NF instances in different PLMNs.

Optionally, the instance information includes an address of the second NF instance, and correspondingly, the sending the instance information to the first NF instance includes sending the instance information to the first NF instance, such that the first NF instance accesses the second NF instance based on the address of the second NF instance in the instance information.

Optionally, if a quantity of second NF instances corresponding to the NF type of the to-be-accessed NF instance is greater than 1, sending the instance information to the first NF instance includes sending instance information of the second NF instances to the first NF instance, such that the first NF instance determines a target second NF instance in the second NF instances, and accesses the target second NF instance based on an address of the target second NF instance.

Optionally, the instance information includes load information of the second NF instances, such that the first NF instance determines the target second NF instance in a plurality of second NF instances based on the load information of the second NF instances, and accesses the target second NF instance based on the address of the target second NF instance.

Optionally, the obtaining request may further include an NF type of the first NF instance, such that the second NFRF verifies the NF type of the first NF instance before sending the instance information of the second NF instance to the first NFRF, thereby ensuring access security of NF instances in different PLMNs.

In another possible implementation, to ensure that an NFRF can store instance information of NF instances in a PLMN, when an NF instance is added in the PLMN, the added NF instance may be registered in the NFRF. The method includes receiving an NF registration request, where the NF registration request includes instance information of a to-be-registered NF instance and slice information of a network slice to which the to-be-registered NF instance belongs, and generating instance information of the to-be-registered NF instance based on the instance information of the to-be-registered NF instance and the slice information of the network slice to which the to-be-registered NF instance belongs.

Optionally, the instance information of the to-be-registered NF instance includes at least one of an identifier of the to-be-registered NF instance, an NF type of the to-be-registered NF instance, or an address of the to-be-registered NF instance. Additionally, the slice information of the target network slice includes at least one of an identifier of the target network slice or a type of the target network slice.

According to a second aspect, an embodiment of the present application provides a network access control method. The method is performed by a second NFRF in a second PLMN. The method may include receiving, by the second NFRF, an obtaining request sent by a first NFRF, where the obtaining request includes a type of a to-be-accessed network function NF instance and a to-be-accessed network slice identifier; obtaining, based on the obtaining request, instance information of a second NF instance corresponding to the NF type of the to-be-accessed NF instance and the to-be-accessed network slice identifier; and sending the instance information of the second NF instance to the first NFRF.

In the foregoing process, the second NFRF can manage an NF instance in the second PLMN. In this way, after the second NFRF receives the obtaining request sent by the first NFRF, the second NFRF may obtain the instance information of the second NF instance corresponding to the NF type of the to-be-accessed NF instance and the to-be-accessed network slice identifier, and send the instance information of the second NF instance to the first NFRF, such that a first NF instance in a first PLMN may access the second NF instance, thereby improving access reliability of NF instances in different PLMNs.

In a possible implementation, the second NFRF obtains, based on the obtaining request using the following implementation, the instance information of the second NF instance corresponding to the NF type of the to-be-accessed NF instance and the to-be-accessed network slice identifier: obtaining an address and load information of the second NF instance corresponding to the NF type of the to-be-accessed NF instance and the to-be-accessed network slice identifier.

Optionally, before the obtaining an address and load information of the second NF instance corresponding to the NF type of the to-be-accessed NF instance and the to-be-accessed network slice identifier, the method further includes obtaining a quantity of second NF instances corresponding to the NF type of the to-be-accessed NF instance and the to-be-accessed network slice identifier. If the quantity of second NF instances is greater than 1, the method includes performing the step of obtaining an address and load information of the second NF instance corresponding to the NF type of the to-be-accessed NF instance and the to-be-accessed network slice identifier, such that the first NF instance may select a target second NF instance from a plurality of second NF instances based on the load information of the second NF instances.

In another possible implementation, the obtaining request further includes an NF type of the first NF instance, and correspondingly, before obtaining, based on the obtaining request, instance information of a second NF instance corresponding to the NF type of the to-be-accessed NF instance and the to-be-accessed network slice identifier, the method further includes obtaining a first NF type set corresponding to the to-be-accessed NF instance, where each NF type in the first NF type set is an NF type of an NF instance allowed to access the to-be-accessed NF instance. If the first NF type set includes the NF type of the first NF instance, the method includes performing the obtaining the instance information of the second NF instance corresponding to the NF type of the to-be-accessed NF instance and the to-be-accessed network slice identifier. Alternatively, if it is determined that the first NF type set does not include the NF type of the first NF instance, sending limited access prompt information to the first NFRF, such that the first NFRF sends the limited access prompt information to the first NF instance, thereby improving access security of NF instances across PLMNs.

According to a third aspect, an embodiment of the present application provides a network control method. The method may include, when a first NF instance needs to access an NF instance of an NF type of a to-be-accessed NF instance in a second PLMN, obtaining, by the first NF instance, the NF type of the to-be-accessed NF instance and a to-be-accessed network slice identifier of a network slice to which the to-be-accessed NF instance belongs; sending a discovery request to a first network function management module NFRF, where the sending request includes an identifier of the second PLMN, the NF type of the to-be-accessed NF instance, and the to-be-accessed network slice identifier, such that the first NFRF requests a second NFRF in the second PLMN for instance information of a second NF instance corresponding to the NF type of the to-be-accessed NF instance and the to-be-accessed network slice identifier; and receiving, by the first NF instance, the instance information of the second NF instance sent by the first NFRF.

In the foregoing process, before sending the discovery request, the first NF instance first obtains the to-be-accessed network slice identifier, and adds the to-be-accessed network slice identifier to the discovery request sent to the first NFRF, such that the second NFRF can obtain the instance information of the second NF instance based on the NF type of the to-be-accessed NF instance and the to-be-accessed network slice identifier, and the first NF instance may access the second NF instance in the second PLMN.

In a possible implementation, optionally, the first NF instance may obtain, using the following implementation, the to-be-accessed network slice identifier of the network slice to which the to-be-accessed NF instance belongs, where the method further includes obtaining a first network slice type of a first network slice to which the first NF instance belongs, determining, based on a function type corresponding to the first NF instance, a second network slice type, in the second PLMN, that corresponds to the first network slice type, and determining the second network slice type as the to-be-accessed network slice identifier.

Optionally, if the function type corresponding to the first NF instance is a first function type, the first network slice type of the first network slice to which the first NF instance belongs is determined as the second network slice type, where a slice type of a network function corresponding to the first function type is the same in all PLMNs.

Optionally, if the function type corresponding to the first NF instance is a second function type, a policy management unit is requested for the second network slice type, where a slice type of a network function corresponding to the second function type is different in different PLMNs.

Optionally, the first NF instance may send a slice type obtaining request to the policy management unit, where the network slice obtaining request includes the first network slice type and the identifier of the second PLMN; and receive the second network slice type, in the second PLMN, that is sent by the policy management unit and that corresponds to the first network slice type.

According to a fourth aspect, an embodiment of the present application provides a network access control apparatus, where the network access control apparatus is applied to a first NFRF in a first PLMN, and the apparatus includes a receive module, a processing module, and a transmit module. The receive module is configured to receive a discovery request sent by a first network function NF instance, where the discovery request includes an identifier of a second PLMN and an NF type of a to-be-accessed NF instance. The processing module is configured to obtain a to-be-accessed network slice identifier. The transmit module is configured to send an obtaining request to a second NFRF corresponding to the identifier of the second PLMN, where the obtaining request includes the NF type of the to-be-accessed NF instance and the to-be-accessed network slice identifier. The receive module is configured to receive instance information of a second NF instance corresponding to the NF type of the to-be-accessed NF instance and the to-be-accessed network slice identifier that are sent by the second NFRF, and the transmit module is configured to send the instance information to the first NF instance.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

In a possible implementation, the to-be-accessed network slice identifier is a type of the to-be-accessed network slice. Alternatively, the to-be-accessed network slice identifier is a combination of a type of the to-be-accessed network slice and a tenant identifier.

In another possible implementation, the discovery request includes the to-be-accessed network slice identifier, and correspondingly, the processing module is configured to obtain the to-be-accessed network slice identifier from the discovery request.

In another possible implementation, the processing module is configured to obtain a function type corresponding to the first NF instance, and determine the to-be-accessed network slice identifier based on the function type corresponding to the first NF instance.

In another possible implementation, the processing module is configured to obtain a first network slice type of a first network slice to which the first NF instance belongs, determine, based on a function type corresponding to the first NF instance, a second network slice type, in the second PLMN, that corresponds to the first network slice type, and determine the second network slice type as the to-be-accessed network slice identifier.

In another possible implementation, the processing module is configured such that if the function type corresponding to the first NF instance is a first function type, the processing module determines the first network slice type of the first network slice to which the first NF instance belongs as the second network slice type, where a slice type of a network function corresponding to the first function type is the same in all PLMNs. If the function type corresponding to the first NF instance is a second function type, the processing module requests a policy management unit for the second network slice type, where a slice type of a network function corresponding to the second function type is different in different PLMNs.

In another possible implementation, the transmit module is further configured to send a slice type obtaining request to the policy management unit, where the network slice obtaining request includes the first network slice type and the identifier of the second PLMN, and where the receive module is further configured to receive the second network slice type, in the second PLMN, that is sent by the policy management unit and that corresponds to the first network slice type.

In another possible implementation, the instance information includes an address of the second NF instance, and correspondingly, the transmit module is configured to send the instance information to the first NF instance, such that the first NF instance accesses the second NF instance based on the address of the second NF instance in the instance information.

In another possible implementation, a quantity of second NF instances corresponding to the NF type of the to-beaccessed NF instance is greater than 1, and correspondingly, the transmit module is configured to send instance information of the second NF instances to the first NF instance, such that the first NF instance determines a target second NF instance in the second NF instances, and accesses the target second NF instance based on an address of the target second NF instance.

In another possible implementation, the instance information includes load information of the second NF instances, such that the first NF instance determines the target second NF instance in a plurality of second NF instances based on the load information of the second NF instances, and accesses the target second NF instance based on the address of the target second NF instance.

In another possible implementation, the receive module is further configured to receive an NF registration request, where the NF registration request includes instance information of a to-be-registered NF instance and slice information of a network slice to which the to-be-registered NF instance belongs. Additionally, the processing module is further configured to generate instance information of the to-be-registered NF instance based on the instance information of the to-be-registered NF instance and the slice information of the network slice to which the to-be-registered NF instance belongs.

In another possible implementation, the instance information of the to-be-registered NF instance includes at least one of an identifier of the to-be-registered NF instance, an NF type of the to-be-registered NF instance, or an address of the to-be-registered NF instance. Additionally, the slice information of the target network slice includes at least one of an identifier of the target network slice or a type of the target network slice.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

According to a fifth aspect, an embodiment of the present application provides another network access control apparatus, where the network access control apparatus is applied to a second NFRF in a second PLMN, and the apparatus includes a receive module, a processing module, and a transmit module. The receive module is configured to receive an obtaining request sent by a first NFRF, where the obtaining request includes a NF type of a to-be-accessed network function NF instance and a to-be-accessed network slice identifier. The processing module is configured to obtain, based on the obtaining request, instance information of a second NF instance corresponding to the NF type of the to-be-accessed NF instance and the to-be-accessed network slice identifier. The transmit module is configured to send the instance information of the second NF instance to the first NFRF.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

In a possible implementation, the processing module is configured to obtain an address and load information of the second NF instance corresponding to the NF type of the to-be-accessed NF instance and the to-be-accessed network slice identifier.

In another possible implementation, the processing module is further configured to obtain a quantity of second NF instances corresponding to the NF type of the to-be-accessed NF instance and the to-be-accessed network slice identified network slice identifier before the processing module obtains the address and load information of the second NF instance corresponding to the NF type of the to-be-accessed NF instance and the to-be-accessed network slice identifier. Additionally, if the quantity of second NF instances is greater than 1, perform the step of obtaining an address and load information of the second NF instance corresponding to the NF type of the to-be-accessed NF instance and the to-be-accessed network slice identifier.

In another possible implementation, the obtaining request further includes the NF type of the first NF instance, and correspondingly, the processing module is further configured to obtain a first NF type set corresponding to the to-be-accessed NF instance before the processing module obtains, based on the obtaining request, the instance information of the second NF instance corresponding to the NF type of the to-be-accessed NF instance and the to-be-accessed network slice identifier, where each NF type in the first NF type set is an NF type of an NF instance allowed to access the to-be-accessed NF instance. If the first NF type set includes the NF type of the first NF instance, the processing module is configured to perform the obtaining instance information of a second NF instance corresponding to the NF type of the to-be-accessed NF instance and the to-be-accessed network slice identifier.

In another possible implementation, the transmit module is further configured to: if it is determined that the first NF type set does not include the NF type of the first NF instance, send limited access prompt information to the first NFRF, such that the first NFRF sends the limited access prompt information to the first NF instance.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

According to a sixth aspect, an embodiment of the present application provides still another network access control apparatus, where the network access control apparatus is applied to a first NF instance, and the apparatus includes a processing module, a transmit module, and a receive module. The processing module is configured to obtain an NF type of a to-be-accessed NF instance and a to-be-accessed network slice identifier of a network slice to which the to-be-accessed NF instance belongs. The transmit module is configured to send a discovery request to a first network function management module NFRF, where the sending request includes an identifier of a second PLMN, the NF type of the to-be-accessed NF instance, and the to-be-accessed network slice identifier, such that the first NFRF requests a second NFRF in the second PLMN for instance information of a second NF instance corresponding to the NF type of the to-be-accessed NF instance and the to-be-accessed network slice identifier. The receive module is configured to receive the instance information of the second NF instance sent by the first NFRF.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

In a possible implementation, the processing module is configured to obtain a first network slice type of a first network slice to which the first NF instance belongs, determine, based on a function type corresponding to the first NF instance, a second network slice type, in the second PLMN, that corresponds to the first network slice type, and determine the second network slice type as the to-be-accessed network slice identifier.

In another possible implementation, the processing module is configured such that if the function type corresponding to the first NF instance is a first function type, the processing module determines the first network slice type of the first network slice to which the first NF instance belongs as the second network slice type, where a slice type of a network function corresponding to the first function type is the same in all PLMNs. If the function type corresponding to the first NF instance is a second function type, the processing module requests a policy management unit for the second network slice type, where a slice type of a network function corresponding to the second function type is different in different PLMNs.

In another possible implementation, the transmit module is further configured to send a slice type obtaining request to the policy management unit, where the network slice obtaining request includes the first network slice type and the identifier of the second PLMN, and where the receive module is further configured to receive the second network slice type, in the second PLMN, that is sent by the policy management unit and that corresponds to the first network slice type.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

According to a seventh aspect, an embodiment of the present application provides a network access control device, where the network access control device is applied to a first NFRF in a first PLMN, and the device includes a receiver, a processor, a transmitter, a memory, and a communications bus, where the memory is configured to store a program, the communications bus is configured to implement a communications connection between elements, and the processor may read the program in the memory and perform a corresponding operation. The receiver is configured to receive a discovery request sent by a first network function NF instance, where the discovery request includes an identifier of a second PLMN and an NF type of a to-be-accessed NF instance. The processor is configured to obtain a to-be-accessed network slice identifier. The transmitter is configured to send an obtaining request to a second NFRF corresponding to the identifier of the second PLMN, where the obtaining request includes the NF type of the to-be-accessed NF instance and the to-be-accessed network slice identifier. The receiver is configured to receive instance information of a second NF instance corresponding to the NF type of the to-be-accessed NF instance and the to-be-accessed network slice identifier that are sent by the second NFRF, and the transmitter is configured to send the instance information to the first NF instance.

The network access control device shown in this embodiment of the present application may perform the technical solutions shown in the foregoing method embodiments. An implementation principle and a beneficial effect of the apparatus are similar to those of the foregoing method embodiments. Details are not described herein again.

In a possible implementation, the to-be-accessed network slice identifier is a type of the to-be-accessed network slice, or the to-be-accessed network slice identifier is a combination of a type of the to-be-accessed network slice and a tenant identifier.

In another possible implementation, the discovery request includes the to-be-accessed network slice identifier, and correspondingly, the processor is configured to obtain the to-be-accessed network slice identifier from the discovery request.

In another possible implementation, the processor is configured to obtain a function type corresponding to the first NF instance, and determine the to-be-accessed network slice identifier based on the function type corresponding to the first NF instance.

In another possible implementation, the processor is configured to obtain a first network slice type of a first network slice to which the first NF instance belongs, determine, based on a function type corresponding to the first NF instance, a second network slice type, in the second PLMN, that corresponds to the first network slice type, and determine the second network slice type as the to-be-accessed network slice identifier.

In another possible implementation, the processor is configured such that if the function type corresponding to the first NF instance is a first function type, the processor determines the first network slice type of the first network slice to which the first NF instance belongs as the second network slice type, where a slice type of a network function corresponding to the first function type is the same in all PLMNs. If the function type corresponding to the first NF instance is a second function type, the processor requests a policy management unit for the second network slice type, where a slice type of a network function corresponding to the second function type is different in different PLMNs.

In another possible implementation, the transmitter is further configured to send a slice type obtaining request to the policy management unit, where the network slice obtaining request includes the first network slice type and the identifier of the second PLMN, and where the receiver is further configured to receive the second network slice type, in the second PLMN, that is sent by the policy management unit and that corresponds to the first network slice type.

In another possible implementation, the instance information includes an address of the second NF instance, and correspondingly, the transmitter is configured to send the instance information to the first NF instance, such that the first NF instance accesses the second NF instance based on the address of the second NF instance in the instance information.

In another possible implementation, a quantity of second NF instances corresponding to the NF type of the to-be-accessed NF instance is greater than 1, and correspondingly, the transmitter is configured to send instance information of the second NF instances to the first NF instance, such that the first NF instance determines a target second NF instance in the second NF instances, and accesses the target second NF instance based on an address of the target second NF instance.

In another possible implementation, the instance information includes load information of the second NF instances, such that the first NF instance determines the target second NF instance in a plurality of second NF instances based on the load information of the second NF instances, and accesses the target second NF instance based on the address of the target second NF instance.

In another possible implementation, the method further includes the receiver receiving an NF registration request, where the NF registration request includes instance information of a to-be-registered NF instance and slice information of a network slice to which the to-be-registered NF instance belongs, and the processor generating instance information of the to-be-registered NF instance based on the instance information of the to-be-registered NF instance and the slice information of the network slice to which the to-be-registered NF instance belongs.

In another possible implementation, the instance information of the to-be-registered NF instance includes at least one of an identifier of the to-be-registered NF instance, an NF type of the to-be-registered NF instance, or an address of the to-be-registered NF instance, where the slice information of the target network slice includes at least one of an identifier of the target network slice or a type of the target network slice.

The network access control device shown in this embodiment of the present application may perform the technical solutions shown in the foregoing method embodiments. An implementation principle and a beneficial effect of the apparatus are similar to those of the foregoing method embodiments. Details are not described herein again.

According to an eighth aspect, an embodiment of the present application provides a network access control device, where the network access control device is applied to a second network function management module NFRF in a second public land mobile network PLMN, and the device includes a receiver, a processor, and a transmitter. The receiver is configured to receive an obtaining request sent by a first NFRF, where the obtaining request includes an NF type of a to-be-accessed network function NF instance and a to-be-accessed network slice identifier. The processor is configured to obtain, based on the obtaining request, instance information of a second NF instance corresponding to the NF type of the to-be-accessed NF instance and the to-be-accessed network slice identifier. The transmitter is configured to send the instance information of the second NF instance to the first NFRF.

The network access control device shown in this embodiment of the present application may perform the technical solutions shown in the foregoing method embodiments. An implementation principle and a beneficial effect of the device are similar to those of the foregoing method embodiments. Details are not described herein again.

In a possible implementation, the processor is configured to obtain an address and load information of the second NF instance corresponding to the NF type of the to-be-accessed NF instance and the to-be-accessed network slice identifier.

In another possible implementation, the processor is further configured to obtain a quantity of second NF instances corresponding to the NF type of the to-be-accessed NF instance and the to-be-accessed network slice identifiered network slice identifier before the processor obtains the address and load information of the second NF instance corresponding to the NF type of the to-be-accessed NF instance and the to-be-accessed network slice identifier, and if the quantity of second NF instances is greater than 1, perform the step of obtaining an address and load information of the second NF instance corresponding to the NF type of the to-be-accessed NF instance and the to-be-accessed network slice identifier.

In another possible implementation, the obtaining request further includes an NF type of a first NF instance, and correspondingly, the processor is further configured to obtain a first NF type set corresponding to the to-be-accessed NF instance before the processor obtains, based on the obtaining request, the instance information of the second NF instance corresponding to the NF type of the to-be-accessed NF instance and the to-be-accessed network slice identifier, where each NF type in the first NF type set is an NF type of an NF instance allowed to access the to-be-accessed NF instance. Further, if the first NF type set includes the NF type of the first NF instance, the processor is configured to perform the obtaining instance information of a second NF instance corresponding to the NF type of the to-be-accessed NF instance and the to-be-accessed network slice identifier.

In another possible implementation, the transmitter is further configured to: if it is determined that the first NF type set does not include the NF type of the first NF instance, send limited access prompt information to the first NFRF, such that the first NFRF sends the limited access prompt information to the first NF instance.

The network access control device shown in this embodiment of the present application may perform the technical solutions shown in the foregoing method embodiments. An implementation principle and a beneficial effect of the device are similar to those of the foregoing method embodiments. Details are not described herein again.

According to a ninth aspect, an embodiment of the present application provides a network control device, where the network control device is applied to a first network function NF instance, and the device includes a processor, a transmitter, and a receiver, where the processor is configured to obtain an NF type of a to-be-accessed NF instance and a to-be-accessed network slice identifier of a network slice to which the to-be-accessed NF instance belongs. The transmitter is configured to send a discovery request to a first network function management module NFRF, where the sending request includes an identifier of a second PLMN, the NF type of the to-be-accessed NF instance, and the to-be-accessed network slice identifier, such that the first NFRF requests a second NFRF in the second PLMN for instance information of a second NF instance corresponding to the NF type of the to-be-accessed NF instance and the to-be-accessed network slice identifier. The receiver is configured to receive the instance information of the second NF instance sent by the first NFRF.

The network access control device shown in this embodiment of the present application may perform the technical solutions shown in the foregoing method embodiments. An implementation principle and a beneficial effect of the device are similar to those of the foregoing method embodiments. Details are not described herein again.

In a possible implementation, the processor is configured to obtain a first network slice type of a first network slice to which the first NF instance belongs, determine, based on a function type corresponding to the first NF instance, a second network slice type, in the second PLMN, that corresponds to the first network slice type, and determine the second network slice type as the to-be-accessed network slice identifier.

In another possible implementation, the processor is configured such that if the function type corresponding to the first NF instance is a first function type, the processor determines the first network slice type of the first network slice to which the first NF instance belongs as the second network slice type, where a slice type of a network function corresponding to the first function type is the same in all PLMNs. If the function type corresponding to the first NF instance is a second function type, the processor requests a policy management unit for the second network slice type, where a slice type of a network function corresponding to the second function type is different in different PLMNs.

In another possible implementation, the transmitter is further configured to send a slice type obtaining request to the policy management unit, where the network slice obtaining request includes the first network slice type and the identifier of the second PLMN, and where the receiver is further configured to receive the second network slice type, in the second PLMN, that is sent by the policy management unit and that corresponds to the first network slice type.

The network access control device shown in this embodiment of the present application may perform the technical solutions shown in the foregoing method embodiments. An implementation principle and a beneficial effect of the device are similar to those of the foregoing method embodiments. Details are not described herein again.

According to a tenth aspect, an embodiment of the present application provides a network control system. The network control system includes the network control device according to the seventh aspect to the ninth aspect.

According to the network access control method, apparatus, and device provided in the embodiments of the present application, the first NFRF is disposed in the first PLMN, the second NFRF is disposed in the second PLMN, the first NFRF is configured to store the instance information of the NF instances in the first PLMN, and the second NFRF is configured to store the instance information of the NF instances in the second PLMN. When the first NF instance in the first PLMN needs to access the second NF instance in the second PLMN, the first NF instance may obtain the instance information of the second NF instance based on the first NFRF and the second NFRF, and access the second NF instance based on the instance information of the second NF instance, in order to ensure that the first NF instance in the first PLMN may access an NF instance in the second PLMN, thereby improving the access reliability of NF instances in different PLMNs.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. The described embodiments are some but not all of the embodiments of the present application. All other embodiments obtained by persons of ordinary skill in the art based on the embodiments of the present application without creative efforts shall fall within the protection scope of the present application.

Figure 1:
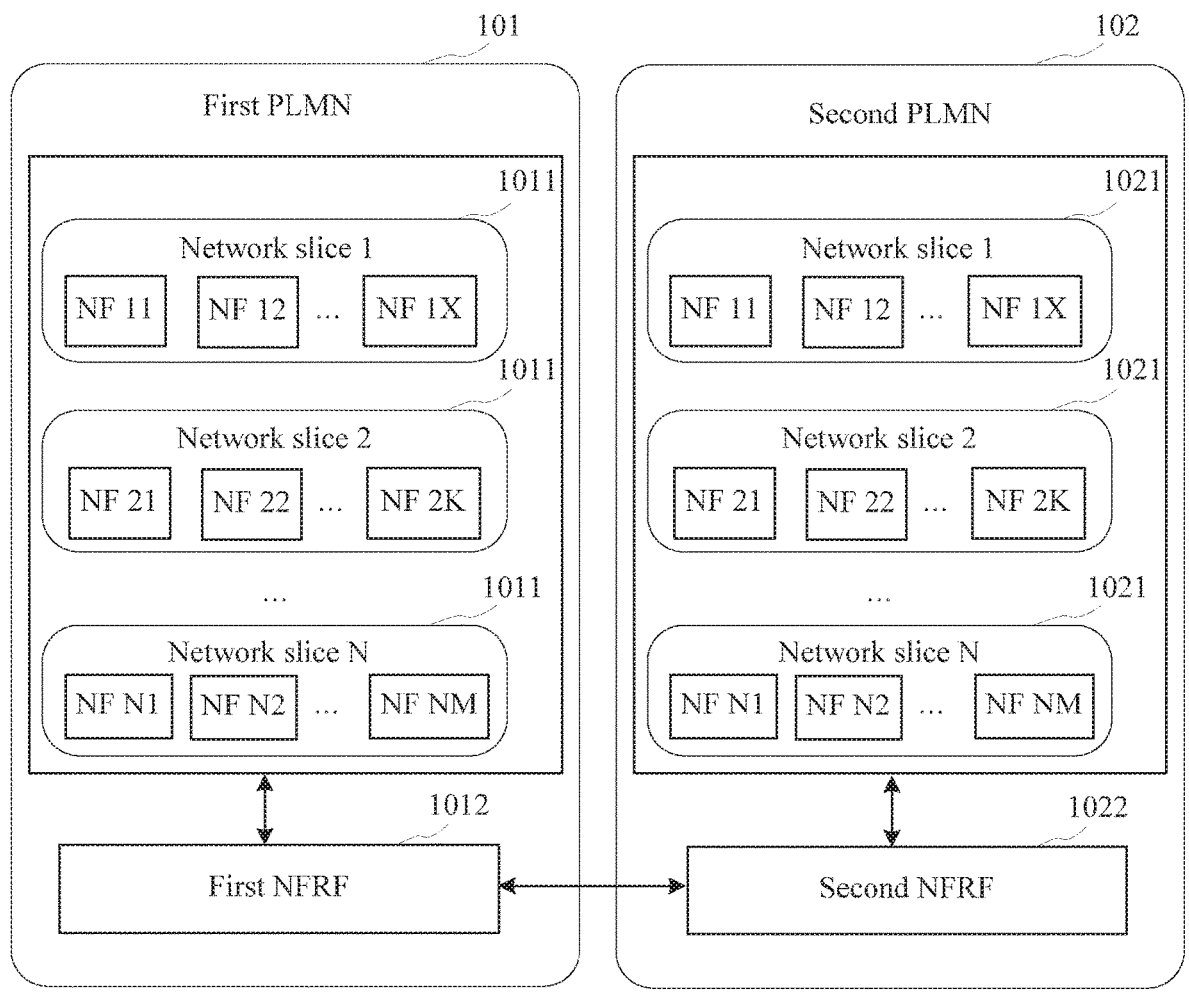
FIG. 1 is a schematic diagram of an application scenario of a network access control method according to an embodiment of the present application.

FIG. 1 is a schematic diagram of an application scenario of a network access control method according to an embodiment of the present application. Referring to FIG. 1, a first PLMN 101 and a second PLMN 102 are included. The first PLMN 101 includes a plurality of network slices 1011 and a first NFRF 1012, and the second PLMN 102 includes a plurality of network slices 1021 and a second NFRF 1022. A plurality of NF instances are disposed in each network slice. The first NFRF 1012 may manage the NF instances in the network slices 1011 of the first PLMN 101, and the second NFRF 1022 may manage the NF instances in the network slices 1021 of the second PLMN 102.

In this application, when an NF instance in the first PLMN 101 needs to access an NF instance in the second PLMN, the NF instance in the first PLMN 101 may obtain, using the first NFRF 1012 and the second NFRF 1022, information of the NF instance that needs to be accessed in the second PLMN 102 (for example, a type of a network slice to which the NF instance belongs), and access, based on the information of the NF instance that needs to be accessed, the NF instance that needs to be accessed.

Optionally, a scenario in which the NF instance in the first PLMN 101 needs to access the NF instance in the second PLMN may be: A SIM card used by a terminal device is provided by an operator corresponding to the second PLMN, and if the terminal device is located in the first PLMN, when a service needs to be provided for the terminal device, an NF instance in the first PLMN 101 needs to access an NF instance in the second PLMN, and the NF instance in the first PLMN 101 interacts with the NF instance in the second PLMN, to provide the service for the terminal device. Certainly, the scenario in which the NF instance in the first PLMN 101 needs to access the NF instance in the second PLMN may further include another scenario. This is not limited in the present application.

In this application, a corresponding NFRF is disposed for each PLMN, and the NFRF may manage NF instances in network slices of the PLMN, such that an NF instance in a PLMN may access an NF instance in another PLMN using the NFRF, thereby improving access reliability of NF instances in different PLMNs.

It should be noted that the first PLMN and the second PLMN in this embodiment of this application are substantially the same. For ease of description, a PLMN corresponding to the terminal device after roaming is referred to as the first PLMN, and a PLMN corresponding to the terminal device before the roaming is referred to as the second PLMN. Certainly, the first PLMN may alternatively be a PLMN corresponding to another terminal device before roaming, and the second PLMN may alternatively be a PLMN corresponding to the other terminal device after the roaming. Similarly, for ease of description, an NFRF corresponding to the first PLMN is referred to as the first NFRF, an NFRF corresponding to the second PLMN is referred to as the second NFRF, an NF in the first PLMN is referred to as a first NF, and an NF in the second PLMN is referred to as a second NF.

The following embodiments describe, in detail, the technical solutions shown in this application. It should be noted that the following several embodiments may be combined with each other. A same or similar concept or process may not be described again in some embodiments.

Figure 2:
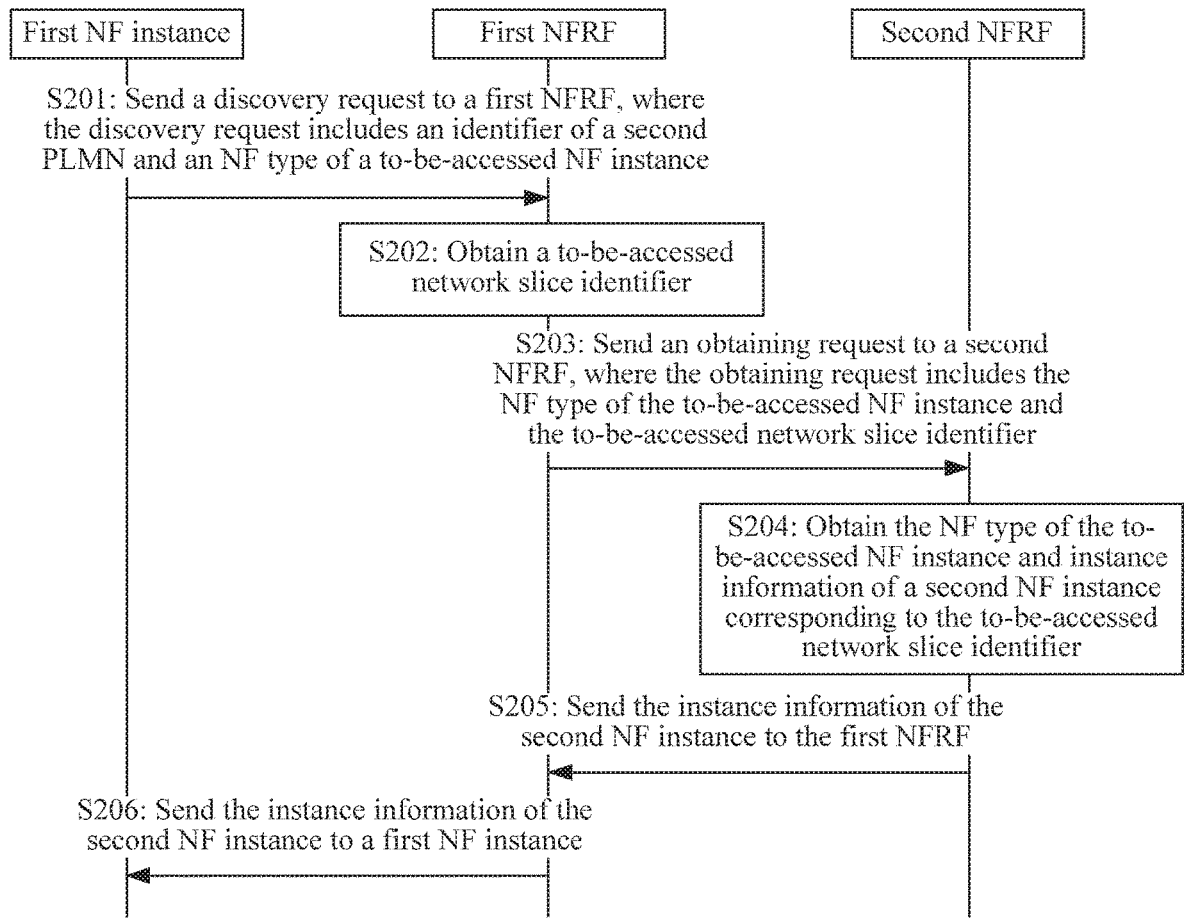
FIG. 2 is a schematic flowchart 1 of a network access control method according to an embodiment of the present application.

FIG. 2 is a schematic flowchart 1 of a network access control method according to an embodiment of the present application. Referring to FIG. 2, the method may include the following steps.

S201: A first NF instance sends a discovery request to a first NFRF, where the discovery request includes an identifier of a second PLMN and an NF type of a to-be-accessed NF instance.

S202: The first NFRF obtains a to-be-accessed network slice identifier.

S203: The first NFRF sends an obtaining request to a second NFRF corresponding to the identifier of the second PLMN, where the obtaining request includes the NF type of the to-be-accessed NF instance and the to-be-accessed network slice identifier.

S204: The second NFRF obtains, based on the obtaining request, instance information of a second NF instance corresponding to the NF type of the to-be-accessed NF instance and the to-be-accessed network slice identifier.

S205: The second NFRF sends the instance information of the second NF instance to the first NFRF.

S206: The first NFRF sends the instance information of the second NF instance to the first NF instance.

In the embodiment shown in FIG. 2, the first NFRF is an NFRF corresponding to a first PLMN, the first NF instance is any NF instance in any network slice of the first PLMN, the second NFRF is an NFRF corresponding to the second PLMN, and the first PLMN and the second PLMN are different PLMNs.

In an application process according to an embodiment, assuming that a terminal device corresponds to the second PLMN (the second PLMN provides a service for the terminal device), if the terminal device roams in the first PLMN when the first NF instance needs to access an NF instance in the second PLMN in a process in which the first NF instance in the first PLMN provides the service for the terminal device, the first NF instance sends a discovery request to the first NFRF. The discovery request includes the identifier of the second PLMN and the NF type of the to-be-accessed NF instance. The discovery request is used to request access to the NF instance in the second PLMN. The NF type of the NF instance is a type of a network function owned by the NF instance, for example, a mobility management function, a packet data session connection management function, a user authentication function, and a policy management function.

After the first NFRF receives the discovery request sent by a first NF instance, the first NFRF obtains the identifier of the second PLMN and the NF type of the to-be-accessed NF instance from the discovery request, and determines the second NFRF corresponding to the identifier of the second PLMN and an identifier of a network slice to which an NF instance corresponding to the to-be-accessed NF instance belongs (the to-be-accessed network slice identifier). The first NFRF sends the obtaining request to the second NFRF. The obtaining request includes the NF type of the to-be-accessed NF instance and the to-be-accessed network slice identifier. Optionally, the to-be-accessed network slice identifier may be a type of a to-be-accessed network slice, or the to-be-accessed network slice identifier may be a combination of a type of a to-be-accessed network slice and a tenant identifier. If the to-be-accessed network slice is a network slice rented to a tenant, the to-be-accessed network slice identifier may be the combination of the type of the to-be-accessed network slice and the tenant identifier. If the to-be-accessed network slice is a general network slice (e.g., a non-rental network slice) of an operator, the to-be-accessed network slice identifier may be the type of the to-be-accessed network slice.

After the second NFRF receives the obtaining request sent by the first NFRF, the second NFRF obtains, based on the obtaining request, the instance information of the second NF instance corresponding to the NF type of the to-be-accessed NF instance and the to-be-accessed network slice identifier. Optionally, the second NFRF stores instance information of all NF instances in all network slices of the second PLMN. The second NFRF may obtain, from the stored instance information based on the NF type of the to-be-accessed NF instance and the to-be-accessed network slice identifier, the instance information of the second NF instance corresponding to the NF type of the to-be-accessed NF instance and the to-be-accessed network slice identifier. Optionally, the instance information may include address information, load information, and the like of the NF instances. Content included in the instance information may be set depending on an actual requirement. This is not limited in the present application. Optionally, a quantity of second NF instances obtained by the second NFRF may be 1 or more.

After the second NFRF obtains the instance information of the second NF instance, the second NFRF sends the instance information of the second NF instance to the first NFRF, such that the first NFRF sends the instance information to the first NF instance, and the first NF instance accesses the second NF instance based on the received instance information. Optionally, the instance information of the second NF instance includes an address of the second NF instance. Correspondingly, the first NF instance may access the second NF instance based on the address of the second NF instance in the instance information.

Optionally, when the quantity of second NF instances obtained by the second NFRF is 1, the first NF instance may access the second NF instance directly based on instance information of the second NF instance. When the quantity of second NF instances obtained by the second NFRF is greater than 1, the second NFRF may select a target second NF instance from a plurality of second NF instances, and access the target second NF instance based on instance information of the target second NF instance.

Optionally, the instance information may further include the load information of the second NF instances, such that the first NF instance may select a target second NF instance based on the load information of the second NF instances. For example, the first NF instance may determine a second NF instance with minimum load as the target second NF instance. Optionally, the instance information may further include priorities of the second NF instances, such that the first NF instance may select a target second NF instance based on the priorities of the second NF instances. For example, the first NF instance may determine a second NF instance with a highest priority as the target second NF instance. Certainly, if the instance information does not include information of the second NF instances, for example, the load information and the priorities, the first NF instance may alternatively determine any one of the second NF instances as the target second NF instance.

According to the network access control method provided in this embodiment of the present application, the first NFRF is disposed in the first PLMN, the second NFRF is disposed in the second PLMN, the first NFRF is configured to store the instance information of the NF instances in the first PLMN, and the second NFRF is configured to store the instance information of the NF instances in the second PLMN. When the first NF instance in the first PLMN needs to access the second NF instance in the second PLMN, the first NF instance may obtain the instance information of the second NF instance using the first NFRF and the second NFRF, and access the second NF instance based on the instance information of the second NF instance, in order to ensure that the first NF instance in the first PLMN may access an NF instance in the second PLMN, thereby improving access reliability of NF instances in different PLMNs.

In the embodiment shown in FIG. 2, to ensure that an NFRF can store instance information of all NF instances in a PLMN, when an NF instance is added in the PLMN, the added NF instance may be registered in the NFRF. The NFRF may be an NFRF corresponding to any PLMN. A process in which the NF instance is registered in the NFRF is described below in detail using an embodiment shown in FIG. 3.

Figure 3:
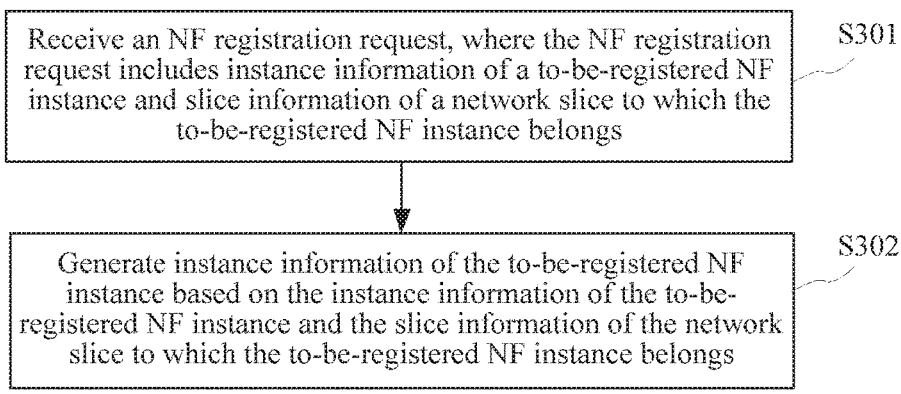
FIG. 3 is a schematic flowchart of a method for registering an NF instance in an NFRF according to an embodiment of the present application.

FIG. 3 is a schematic flowchart of a method for registering an NF instance in an NFRF according to an embodiment of the present application. Referring to FIG. 3, the method may include the following steps.

S301: Receive an NF registration request, where the NF registration request includes instance information of a to-be-registered NF instance and slice information of a network slice to which the to-be-registered NF instance belongs.

S302: Generate instance information of the to-be-registered NF instance based on the instance information of the to-be-registered NF instance and the slice information of the network slice to which the to-be-registered NF instance belongs.

In the embodiment shown in FIG. 3, each network slice in a PLMN may correspond to a slice management unit. When a user needs to add an NF instance in a network slice, the user may input an NF registration request using a slice management unit, such that the slice management unit sends the NF registration request to an NFRF. The NF registration request includes instance information of the to-be-registered NF instance and slice information of the network slice to which the to-be-registered NF instance belongs. Optionally, the instance information of the to-be-registered NF instance includes at least one of an identifier of the to-be-registered NF instance, an NF type of the to-be-registered NF instance, or an address of the to-be-registered NF instance. Additionally, the slice information of the target network slice includes at least one of an identifier of the target network slice or a type of the target network slice.

After receiving the NF registration request, the NFRF generates instance information of the to-be-registered NF instance based on the instance information of the to-be-registered NF instance and the slice information of the network slice to which the to-be-registered NF instance belongs, where the instance information and the slice information are in the registration request. Optionally, after generating the instance information of the to-be-registered NF instance, the NFRF may feed back the generated instance information of the to-be-registered NF instance to the slice management unit. Optionally, the NFRF may store the instance information of the to-be-registered NF instance in a form, such as a table.

For example, the NFRF may store instance information of NF instances in a corresponding PLMN using Table 1:

TABLE 1

| Identifier of a network slice | Identifier of an NF instance | Instance information |
| --- | --- | --- |
| Network slice 1 | NF instance 11 | Address = address 11, and network slice to which the NF instance 11 belongs = network slice 1 |
|  | NF instance 12 | Address = address 12, and network slice to which the NF instance 12 belongs = network slice 1 |
|  | NF instance 13 | Address = address 13, and network slice to which the NF instance 13 belongs = network slice 1 |
|  | ... | ... |
| Network slice 2 | NF instance 21 | Address = address 21, and network slice to which the NF instance 21 belongs = network slice 2 |
|  | NF instance 22 | Address = address 22, and network slice to which the NF instance 22 belongs = network slice 2 |
|  | NF instance 23 | Address = address 23, and network slice to which the NF instance 23 belongs = network slice 2 |
|  | ... | ... |
| ... | ... | ... |

It should be noted that, Table 1 illustrates only an example of a form in which the NFRF stores the instance information of the NF instances in the PLMN and content included in the instance information, and is not intended to limit the storage form and the content included in the instance information. In an application process according to an embodiment, the storage form and the content included in the instance information may be set depending on an actual requirement.

In the foregoing process, when the NF instance is added in the PLMN, the added NF instance is registered in the NFRF, such that the NFRF generates the instance information of the added NF instance. In this way, it can be ensured that the NFRF can store the instance information of the NF instances in the PLMN.

Based on any one of the foregoing embodiments, the first NFRF may obtain the to-be-accessed network slice identifier corresponding to the to-be-accessed NF instance using the following two possible implementations.

In one possible implementation, when the first NF instance sends the discovery request to the first NFRF, the first NF instance obtains the to-be-accessed network slice identifier, and adds the to-be-accessed network slice identifier to the discovery request, such that the first NFRF can obtain the to-be-accessed network slice identifier from the discovery request.

In the other possible implementation, the first NFRF determines the to-be-accessed network slice identifier based on a function type corresponding to the first NF instance.

In the foregoing two possible implementations, the first NF instance or the first NFRF may obtain the to-be-accessed network slice identifier using the following possible implementation. For example, refer to an embodiment shown in FIG. 4.

Figure 4:
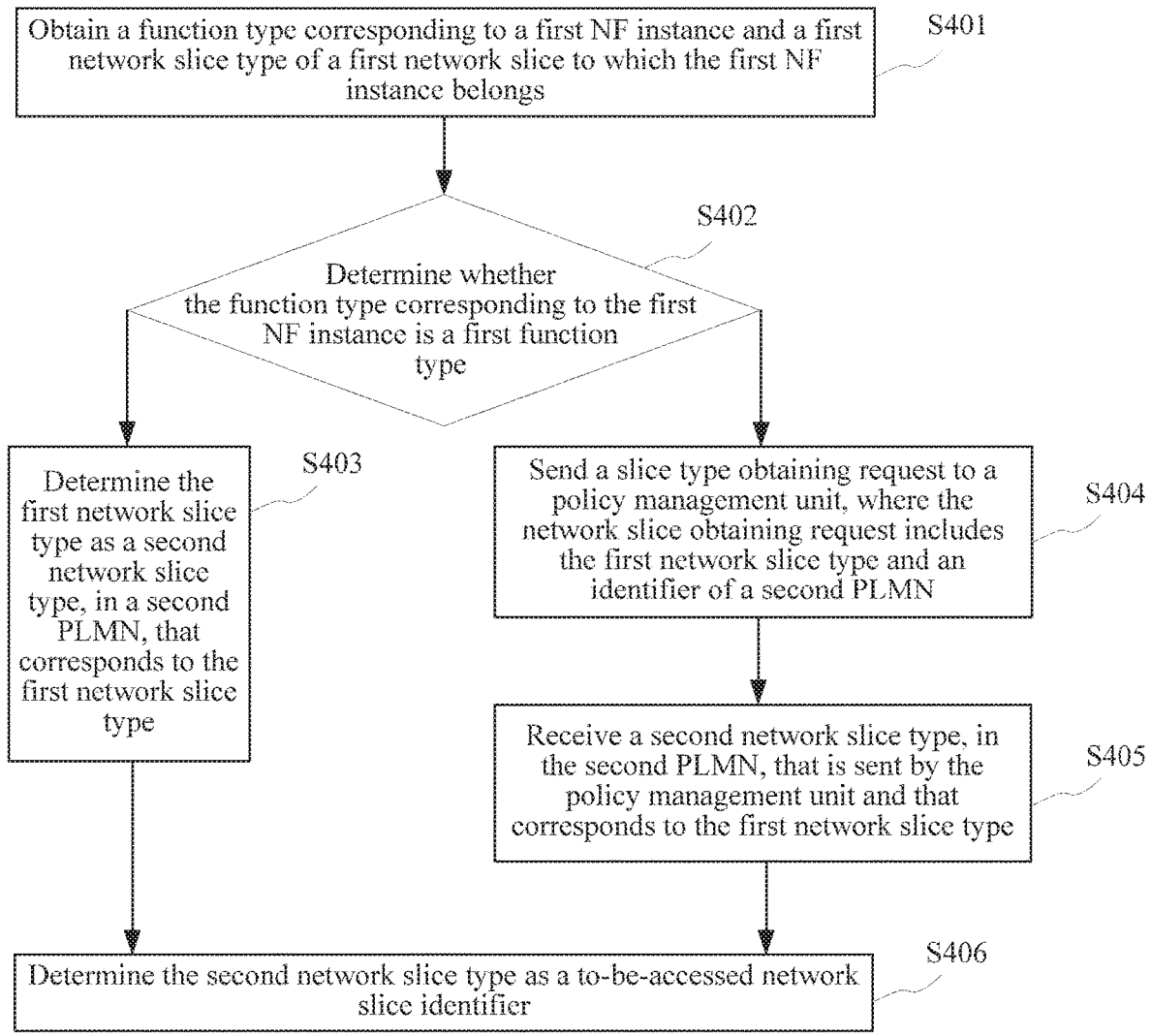
FIG. 4 is a schematic flowchart of a method for obtaining a to-be-accessed network slice identifier according to an embodiment of the present application.

FIG. 4 is a schematic flowchart of a method for obtaining a to-be-accessed network slice identifier according to an embodiment of the present application. Referring to FIG. 4, the method may include the following steps.

S401: Obtain a function type corresponding to a first NF instance and a first network slice type of a first network slice to which the first NF instance belongs.

S402: Determine whether the function type corresponding to the first NF instance is a first function type.

If the function type corresponding to the first NF instance is the first function type, perform S403 and S406.

If the function type corresponding to the first NF instance is not the first function type, perform S404 to S406.

S403: Determine the first network slice type as a second network slice type, in a second PLMN, that corresponds to the first network slice type.

S404: Send a slice type obtaining request to a policy management unit, where the network slice obtaining request includes the first network slice type and an identifier of the second PLMN.

S405: Receive the second network slice type, in the second PLMN, that is sent by the policy management unit and that corresponds to the first network slice type.

S406: Determine the second network slice type as a to-be-accessed network slice identifier.

The embodiment shown in FIG. 4 may be executed by the first NF instance or a first NFRF. When the first NF instance needs to add the to-be-accessed network slice identifier to a discovery request, the first NF instance may obtain the to-be-accessed network slice identifier using the method shown in the embodiment of FIG. 4. When the discovery request received by the first NFRF does not include the to-be-accessed network slice identifier, the first NFRF may obtain the to-be-accessed network slice identifier using the method shown in the embodiment of FIG. 4.

In an application process according to an embodiment, when the to-be-accessed network slice identifier needs to be obtained, the function type corresponding to the first NF instance is first obtained. The function type may include the first function type and a second function type. A slice type of a network function corresponding to the first function type is the same in all PLMNs, and a slice type of a network function corresponding to the second function type is different in different PLMNs. Optionally, a function type is attribute information of an NF instance. The function type of the first NF instance may be obtained from attribute information of the first NF instance.

After the function type corresponding to the first NF instance is obtained, it is determined whether the function type corresponding to the first NF instance is the first function type.

If the function type corresponding to the first NF instance is the first function type, the first network slice type of the first network slice to which the first NF instance belongs is obtained, the first network slice type is determined as the second network slice type, in the second PLMN, that corresponds to the first network slice type, and the second network slice type is determined as the to-be-accessed network slice identifier.

Alternatively, if the function type corresponding to the first NF instance is the second function type, the policy management unit is requested for the second network slice type, in the second PLMN, that corresponds to the first network slice type. Optionally, a slice type obtaining request may be sent to the policy management unit. The network slice obtaining request includes the first network slice type and the identifier of the second PLMN, and the second network slice type, in the second PLMN, that is sent by the policy management unit and that corresponds to the first network slice type is received. Optionally, the policy management unit stores a correspondence between network slices in different PLMNs. Optionally, the correspondence is shown in Table 2:

TABLE 2

Correspondence between network slices in different PLMNs

| | |
|---|---|
| PLMN 1 - network slice 1 | PLMN 2 - network slice 1 |
| PLMN 1 - network slice 2 | PLMN 2 - network slice 3 |
| PLMN 1 - network slice 3 | PLMN 2 - network slice 2 |
| . . . | . . . |
| PLMN 1 - network slice 1 | PLMN 3 - network slice 2 |
| PLMN 1 - network slice 2 | PLMN 3 - network slice 1 |
| PLMN 1 - network slice 3 | PLMN 3 - network slice 4 |
| . . . | . . . |

It should be noted that Table 2 illustrates only an example of the correspondence between network slices in different PLMNs and a storage form of the policy management unit for the correspondence, and is not intended to limit the correspondence and the storage form of the correspondence. In an application process according to an embodiment, the correspondence and the storage form of the correspondence may be set according to an actual requirement.

In the foregoing process, the to-be-accessed network slice identifier corresponding to the to-be-accessed NF instance may be accurately obtained based on the function type corresponding to the first NF instance, thereby further improving access reliability of NF instances in different PLMNs.

Based on any one of the foregoing embodiments, to ensure access security of the NF instances, before the first NFRF obtains the instance information of the second NF instance corresponding to the NF type of the to-be-accessed NF instance and the to-be-accessed network slice identifier, whether the first NF instance has permission to access the to-be-accessed NF instance (the second NF instance) may be further verified. For example, refer to an embodiment shown in FIG. 5.

Figure 5:
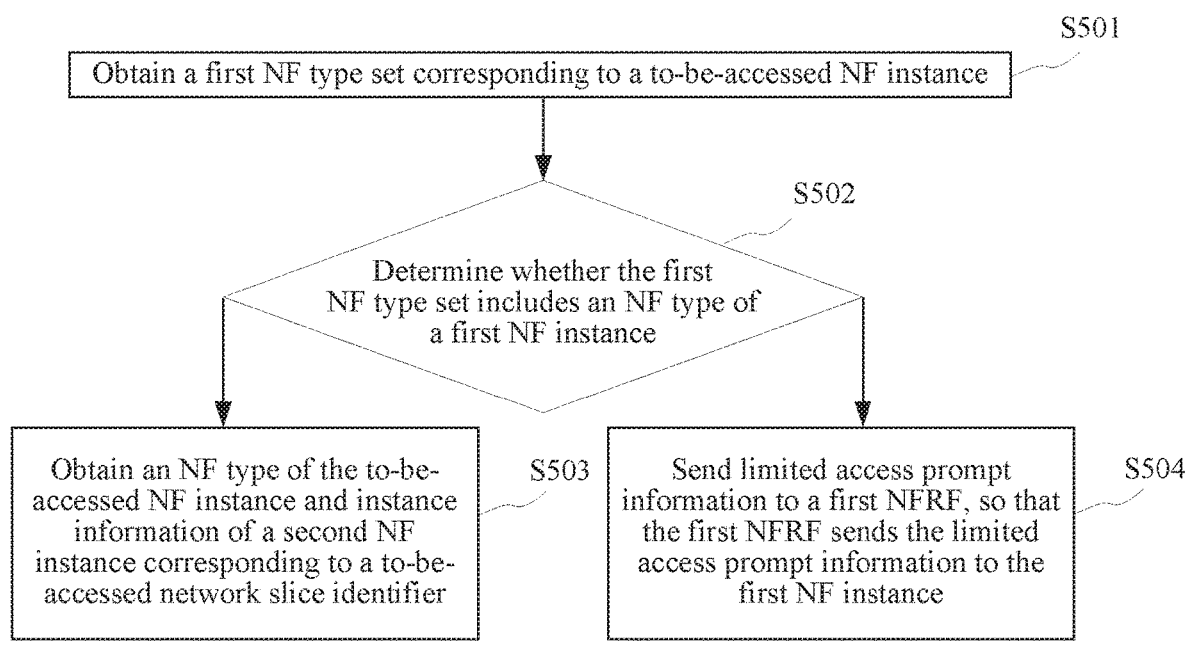
FIG. 5 is a schematic flowchart of a method for verifying a to-be-accessed network slice identifier according to an embodiment of the present application.

FIG. 5 is a schematic flowchart of a method for verifying access permission of a first NF instance according to an embodiment of the present application. Referring to FIG. 5, the method may include the following steps.

S501: Obtain a first NF type set corresponding to a to-be-accessed NF instance, where each NF type in the first NF type set is an NF type of an NF instance allowed to access the to-be-accessed NF instance.

S502: Determine whether the first NF type set includes an NF type of a first NF instance.

If the first NF type set includes the NF type of the first NF instance, perform S503.

If the first NF type set does not include the NF type of the first NF instance, perform S504.

S503: Obtain instance information of a second NF instance corresponding to an NF type of the to-be-accessed NF instance and a to-be-accessed network slice identifier.

S504: Send limited access prompt information to a first NFRF, such that the first NFRF sends the limited access prompt information to the first NF instance.

In the embodiment shown in FIG. 5, an obtaining request sent by the first NFRF to a second NFRF further includes the NF type of the first NF instance. In this way, after receiving the obtaining request, the second NFRF first obtains the first NF type set corresponding to the to-be-accessed NF instance, where each NF type in the first NF type set is an NF type of an NF instance allowed to access the to-be-accessed NF instance, and determines whether the first NF type set includes the NF type of the first NF instance.

If the first NF type set includes the NF type of the first NF instance, it indicates that the first NF instance has permission to access the to-be-accessed NF instance. The second NFRF continues to obtain the instance information of the second NF instance corresponding to the NF type of the to-be-accessed NF instance and the to-be-accessed network slice identifier.

If the first NF type set does not include the NF type of the first NF instance, it indicates that the first NF instance has no permission to access the to-be-accessed NF instance. The second NFRF sends the limited access prompt information to the first NFRF, such that the first NFRF sends the limited access prompt information to the first NF instance.

The network access control method shown in the foregoing embodiments is described in detail below using embodiments shown in FIG. 6A and FIG. 6B to FIG. 8A and FIG. 8B. In an embodiment shown in FIG. 6A and FIG. 6B, a discovery request sent by a first NF instance to a first NFRF includes the to-be-accessed network slice identifier. In an embodiment shown in FIG. 7A and FIG. 7B, a discovery request sent by a first NF instance to a first NFRF does not include a to-be-accessed network slice identifier, and the to-be-accessed network slice identifier is obtained by the first NFRF.

Figure 6A:
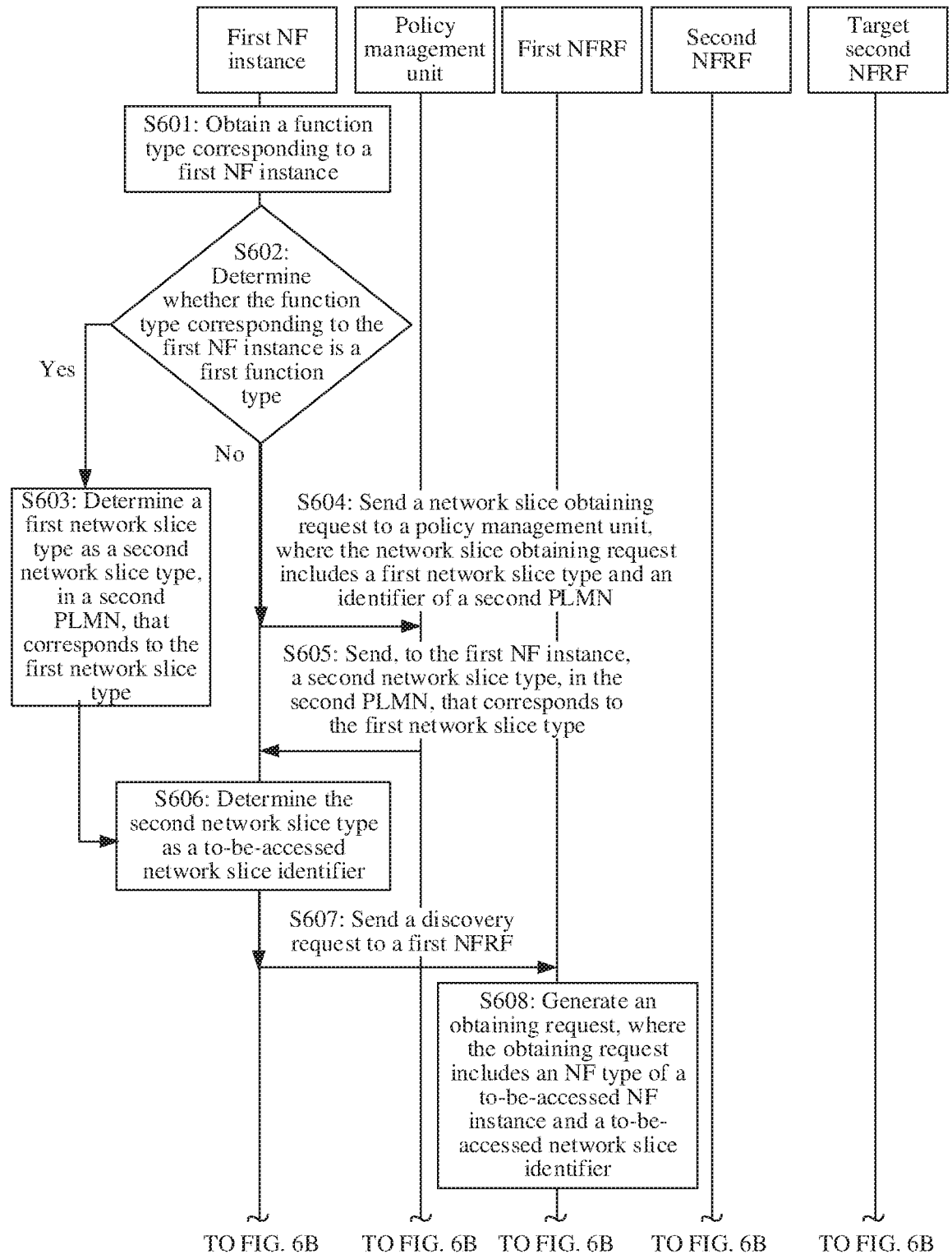
FIG. 6A and FIG. 6B are a schematic flowchart 2 of a network access control method according to an embodiment of the present application.
Figure 6B:
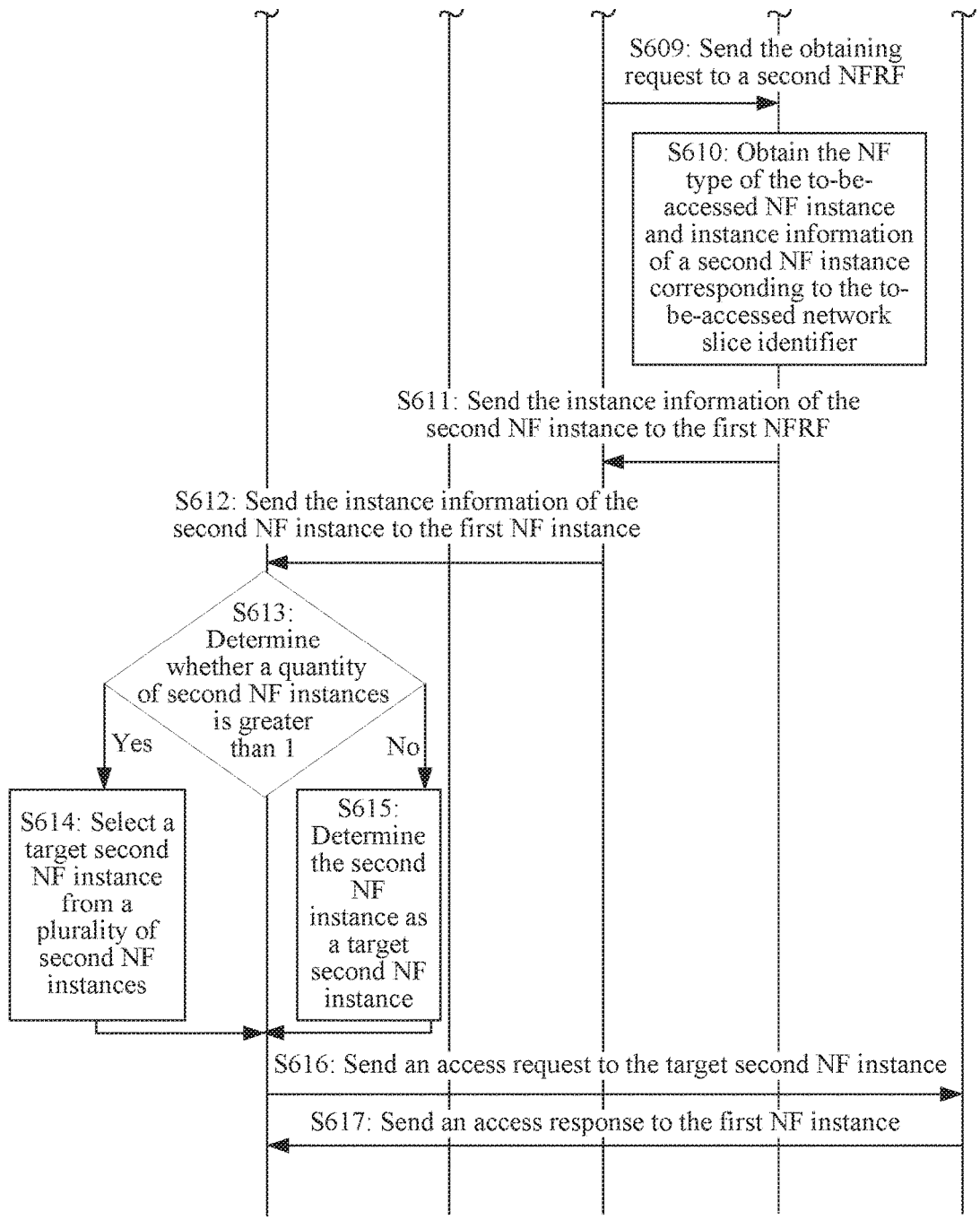

FIG. 6A and FIG. 6B are a schematic flowchart 2 of a network access control method according to an embodiment of the present application. Referring to FIG. 6A and FIG. 6B, the method may include the following steps.

S601: A first NF instance obtains a function type corresponding to the first NF instance.

S602: The first NF instance determines whether the function type corresponding to the first NF instance is a first function type.

If the function type corresponding to the first NF instance is the first function type, perform S603.

If the function type corresponding to the first NF instance is not the first function type, perform S604.

S603: The first NF instance determines a first network slice type as a second network slice type, in a second PLMN, that corresponds to the first network slice type.

Perform S606 after S603.

S604: The first NF instance sends a network slice obtaining request to a policy management unit, where the network slice obtaining request includes a first network slice type and an identifier of a second PLMN.

S605: The policy management unit sends, to the first NF instance, a second network slice type, in the second PLMN, that corresponds to the first network slice type.

S606: The first NF instance determines the second network slice type as a to-be-accessed network slice identifier.

S607: The first NF instance sends a discovery request to a first NFRF, where the discovery request includes the identifier of the second PLMN, an NF type of a to-be-accessed NF instance, and the to-be-accessed network slice identifier.

S608: The first NFRF obtains the NF type of the to-be-accessed NF instance and the to-be-accessed network slice identifier from the discovery request, and generates an obtaining request, where the obtaining request includes the NF type of the to-be-accessed NF instance and the to-be-accessed network slice identifier.

S609: The first NFRF sends the obtaining request to a second NFRF corresponding to the identifier of the second PLMN.

S610: The second NFRF obtains, based on the obtaining request, instance information of a second NF instance corresponding to the NF type of the to-be-accessed NF instance and the to-be-accessed network slice identifier.

S611: The second NFRF sends the instance information of the second NF instance to the first NFRF.

S612: The first NFRF sends the instance information of the second NF instance to the first NF instance.

S613: The first NF instance determines whether a quantity of second NF instances is greater than 1.

If the quantity of second NF instances is greater than 1, perform S614.

If the quantity of second NF instances is not greater than 1, perform S615.

S614: The first NF instance selects a target second NF instance from a plurality of second NF instances.

S615: The first NF instance determines the second NF instance as a target second NF instance.

S616: The first NF instance sends an access request to the target second NF instance.

S617: The second NF instance sends an access response to the first NF instance.

In the embodiment shown in FIG. 6A and FIG. 6B, when the first NF instance needs to access an NF instance in the second PLMN, the first NF instance sends the discovery request to the first NFRF. To enable the first NFRF to quickly obtain the NF instance, when the first NF instance sends the discovery request to the first NFRF, the first NF instance first determines an identifier of a network slice corresponding to the to-be-accessed NF instance (the to-be-accessed network slice identifier). In some implementations, the first NF instance determines the to-be-accessed network slice identifier by performing S601 to S606. It should be noted that, for descriptions of S601 to S606, reference may be made to S401 to S406. Details are not described herein again.

After receiving the discovery request, the first NFRF obtains the NF type of the to-be-accessed NF instance and the to-be-accessed network slice identifier from the discovery request, generates the obtaining request including the NF type of the to-be-accessed NF instance and the to-be-accessed network slice identifier, and sends the obtaining request to the second NFRF corresponding to the identifier of the second PLMN.

The second NFRF obtains, based on the obtaining request, the instance information of the second NF instance corresponding to the NF type of the to-be-accessed NF instance and the to-be-accessed network slice identifier, and sends the instance information of the second NF instance to the first NFRF. Optionally, the second PLMN may determine, based on the obtaining request, a quantity of second NF instances corresponding to the NF type of the to-be-accessed NF instance and the to-be-accessed network slice identifiered network slice identifier, if the quantity of the second NF instances is 1, determine that the instance information of the second NF instance includes an address of the second NF instance. Alternatively, if the quantity of the second NF instances is greater than 1, determine that the instance information of the second NF instance includes an address of each second NF instance and load information of the second NF instance.

After receiving the instance information of the second NF instance, the first NFRF sends the instance information of the second NF instance to the first NF instance. Optionally, the instance information may include the address of the second NF instance, the load information, a priority, and the like. Specific content included in the instance information may be set according to an actual requirement. The first NF instance determines whether the quantity of the second NF instances is greater than 1. If the quantity of the second NF instances is greater than 1, the first NF instance selects the target second NF instance from a plurality of second NF instances. Optionally, the first NF instance may determine an instance with minimum load as the target second NF instance. If the quantity of the second NF instances is not greater than 1, the first NF instance directly determines the second NF instance as the target second NF instance, and sends the access request to the target second NF instance. After receiving the access response of the second NF instance, the first NF instance may access the second NF instance.

It should be noted that, in the network control method shown in the embodiment of FIG. 6A and FIG. 6B, some steps may be replaced with steps having similar functions. This is not limited in the present application.

In the foregoing process, the first NF instance determines the to-be-accessed network slice identifier, to reduce load of the first NFRF, and improve efficiency of obtaining the instance information of the second NF instance by the first NFRF.

Figure 7A:
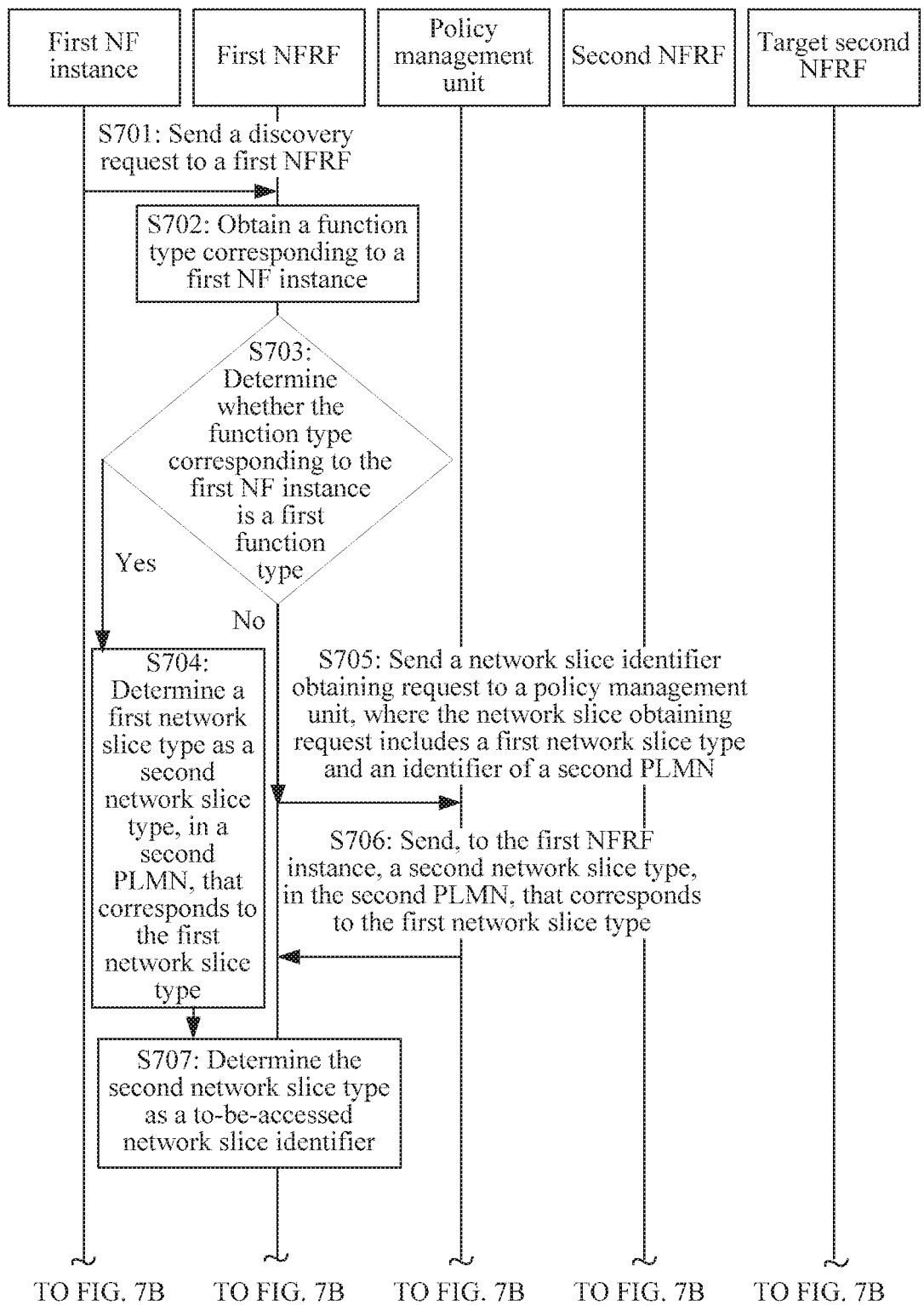
FIG. 7A and FIG. 7B are a schematic flowchart 3 of a network access control method according to an embodiment of the present application.
Figure 7B:
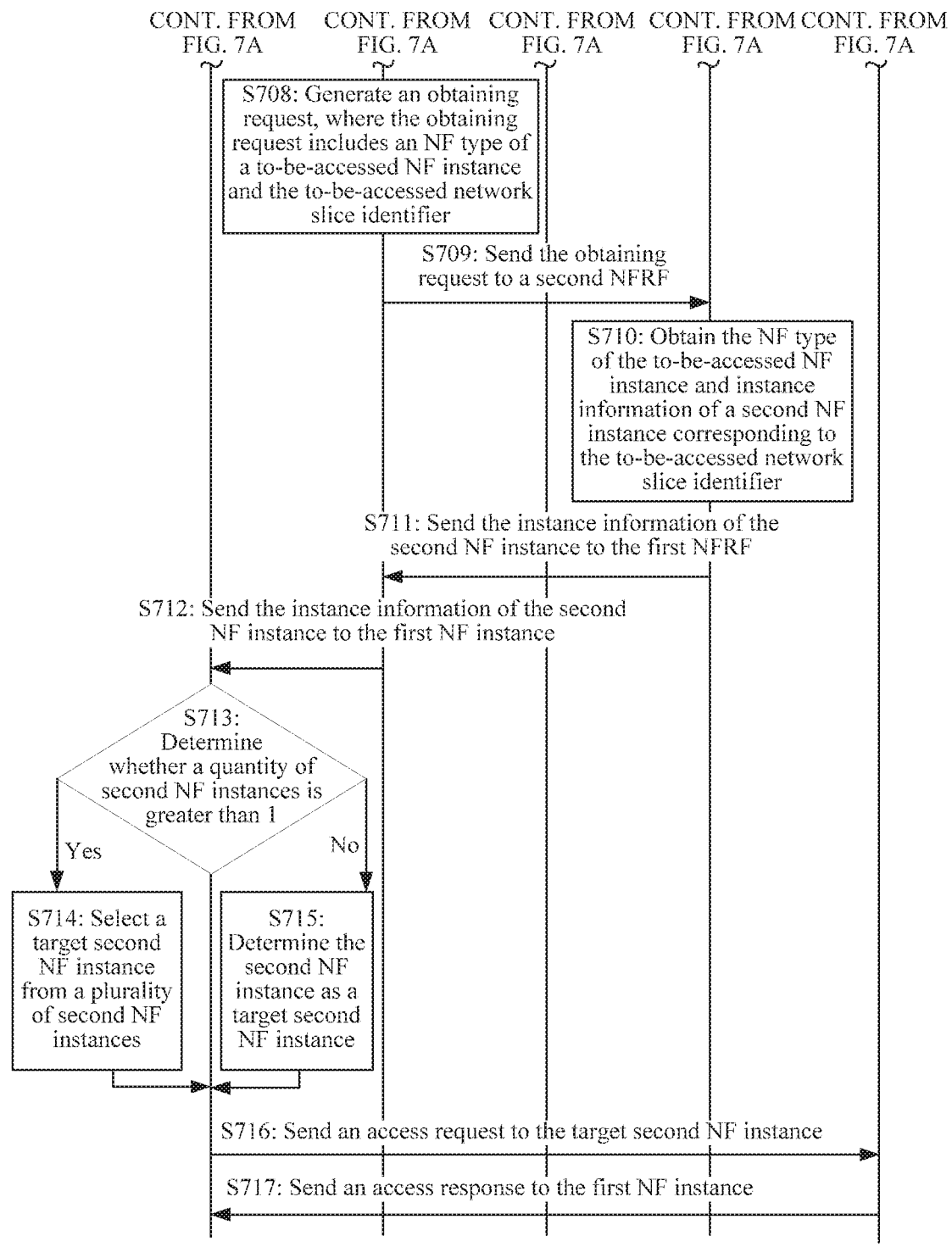

FIG. 7A and FIG. 7B are a schematic flowchart 3 of a network access control method according to an embodiment of the present application. Referring to FIG. 7A and FIG. 7B, the method may include the following steps.

S701: A first NF instance sends a discovery request to a first NFRF, where the discovery request includes an identifier of a second PLMN and an NF type of a to-be-accessed NF instance.

S702: The first NFRF obtains a function type corresponding to the first NF instance.

S703: The first NFRF determines whether the function type corresponding to the first NF instance is a first function type.

If the function type corresponding to the first NF instance is the first function type, perform S704.

If the function type corresponding to the first NF instance is not the first function type, perform S705.

S704: The first NFRF determines a first network slice type as a second network slice type, in the second PLMN, that corresponds to the first network slice type.

Perform S707 after S704.

S705: The first NFRF sends a network slice obtaining request to a policy management unit, where the network slice obtaining request includes a first network slice type and the identifier of the second PLMN.

S706: The policy management unit sends, to the first NFRF, a second network slice type, in the second PLMN, that corresponds to the first network slice type.

S707: The first NFRF determines the second network slice type as a to-be-accessed network slice identifier.

S708: The first NFRF generates an obtaining request based on the NF type of the to-be-accessed NF instance and the to-be-accessed network slice identifier, where the obtaining request includes the NF type of the to-be-accessed NF instance and the to-be-accessed network slice identifier.

S709: The first NFRF sends the obtaining request to a second NFRF corresponding to the identifier of the second PLMN.

S710: The second NFRF obtains, based on the obtaining request, instance information of a second NF instance corresponding to the NF type of the to-be-accessed NF instance and the to-be-accessed network slice identifier.

S711: The second NFRF sends the instance information of the second NF instance to the first NFRF.

S712: The first NFRF sends the instance information of the second NF instance to the first NF instance.

S713: The first NF instance determines whether a quantity of second NF instances is greater than 1.

If the quantity of second NF instances is greater than 1, perform S715.

If the quantity of second NF instances is not greater than 1, perform S715.

S714: The first NF instance selects a target second NF instance from a plurality of second NF instances.

S715: The first NF instance determines the second NF instance as a target second NF instance.

S716: The first NF instance sends an access request to the target second NF instance.

S717: The second NF instance sends an access response to the first NF instance.

In the embodiment shown in FIG. 7A and FIG. 7B, when needing to access an NF instance in the second PLMN, the first NF instance sends the discovery request to the first NFRF. The discovery request includes the identifier of the second PLMN and the NF type of the to-be-accessed NF instance.

After receiving the discovery request, to obtain an NF instance corresponding to the NF type of the to-be-accessed NF instance, the first NFRF needs to determine an identifier of a network slice corresponding to the to-be-accessed NF instance (the to-be-accessed network slice identifier). For example, the first NFRF determines the to-be-accessed network slice identifier by performing S702 to S707. It should be noted that, for descriptions of S702 to S707, reference may be made to S401 to S407, and for descriptions of S709 to S717, reference may be made to S609 to S617. Details are not described herein again.

It should be noted that, in the network control method shown in the embodiment of FIG. 7A and FIG. 7B, some steps may be replaced with steps having similar functions. This is not limited in the present application.

In the foregoing process, the first NFRF determines the to-be-accessed network slice identifier, and there is no need to make a relatively large number of improvements to a function and a structure of a first NF, thereby reducing costs.

Based on the embodiment shown in FIG. 6A and FIG. 6B or FIG. 7A and FIG. 7B, the obtaining request may further include an NF type of the first NF instance, such that the second NFRF first verifies the NF type of the first NF instance before providing the instance information of the second NF instance for the first NF instance. For ease of description, based on the embodiment shown in FIG. 7A and FIG. 7B, this implementation is described in detail using an embodiment shown in FIG. 8A and FIG. 8B.

Figure 8A:
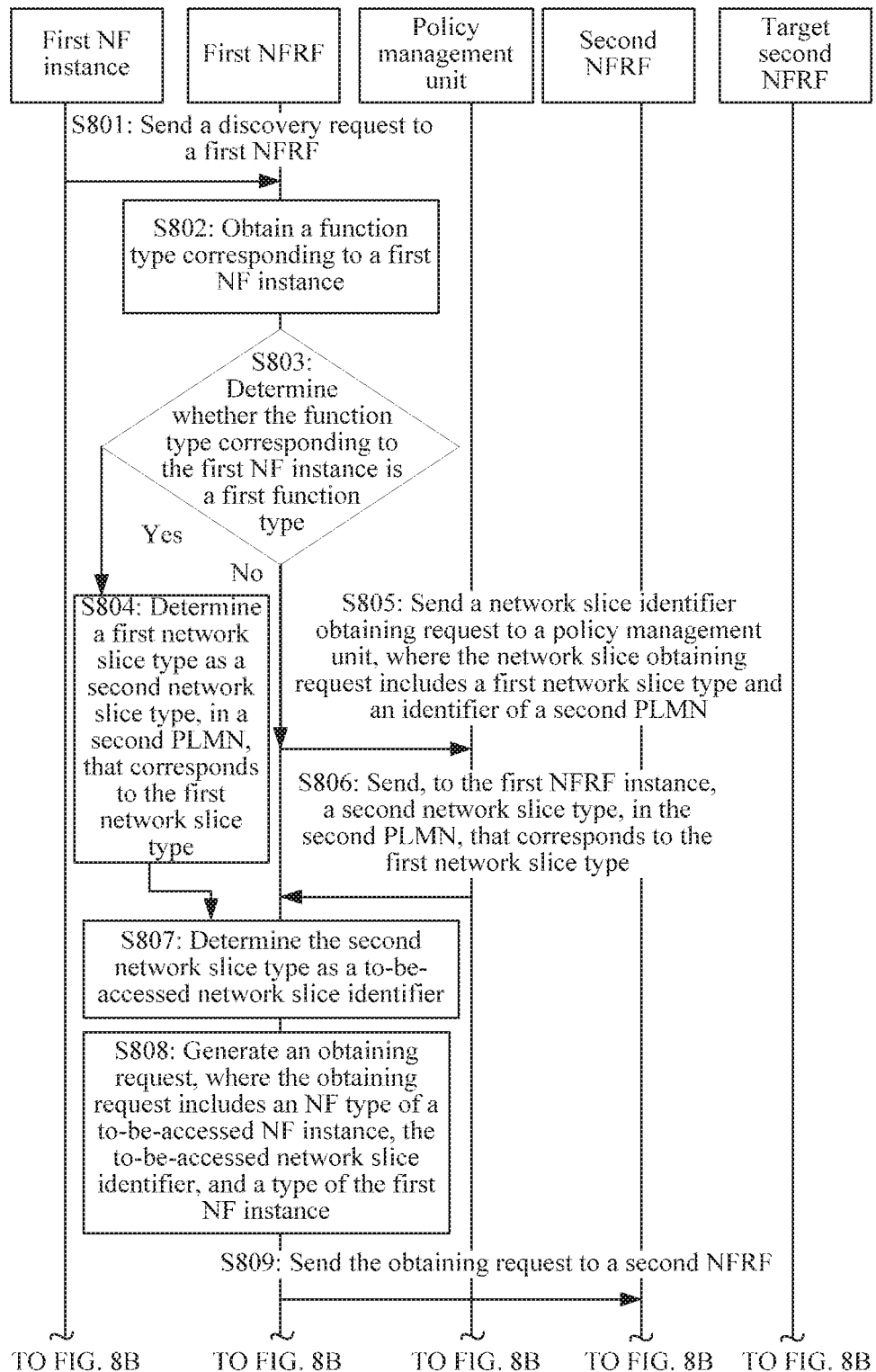
FIG. 8A and FIG. 8B are a schematic flowchart 4 of a network access control method according to an embodiment of the present application.
Figure 8B:
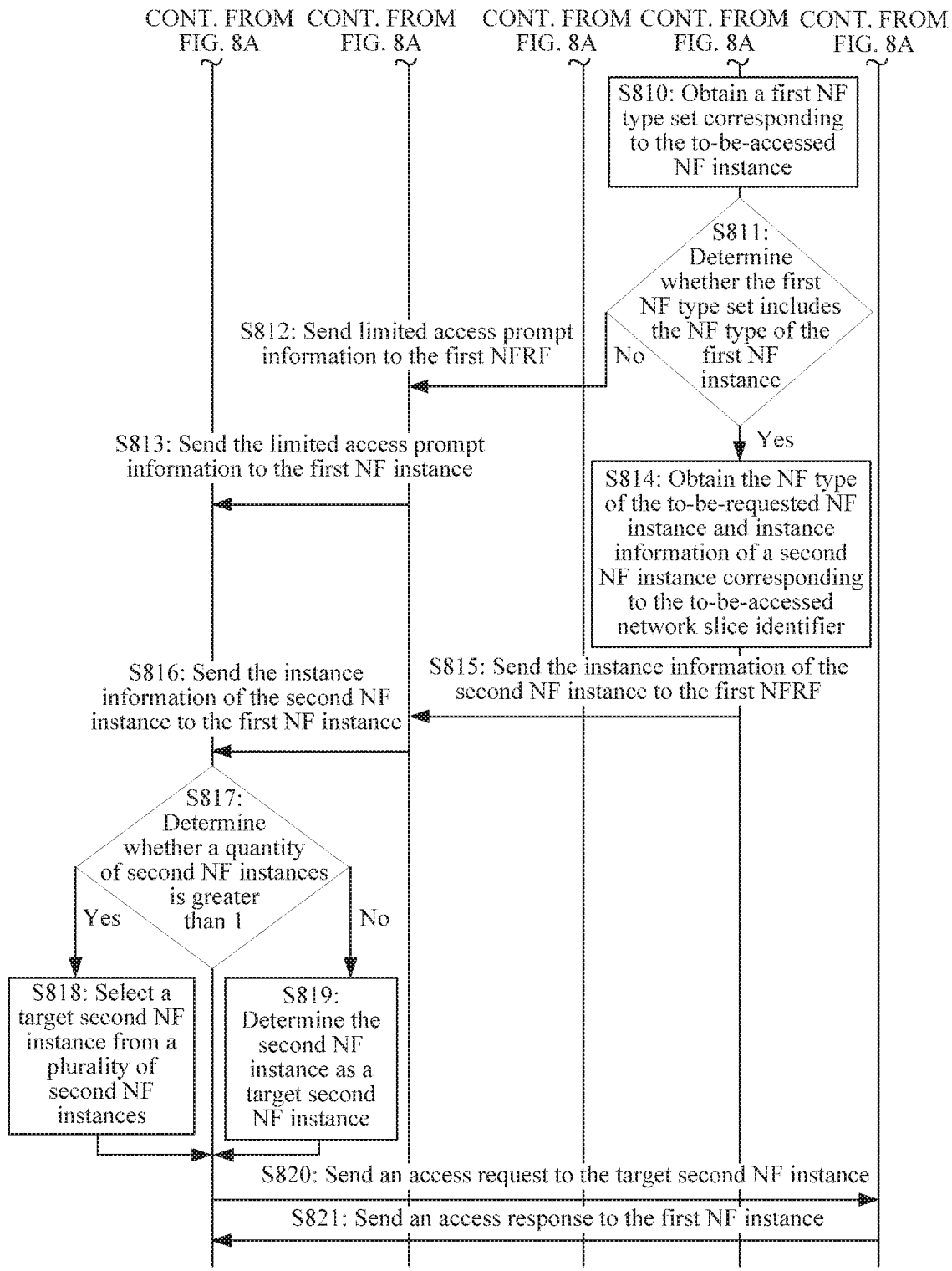

FIG. 8A and FIG. 8B are a schematic flowchart 4 of a network access control method according to an embodiment of the present application. Referring to FIG. 8A and FIG. 8B, the method may include the following steps.

S801: A first NF instance sends a discovery request to a first NFRF, where the discovery request includes an identifier of a second PLMN and an NF type of a to-be-accessed NF instance.

S802: The first NFRF obtains a function type corresponding to the first NF instance.

S803: The first NFRF determines whether the function type corresponding to the first NF instance is a first function type.

If the function type corresponding to the first NF instance is the first function type, perform S804.

If the function type corresponding to the first NF instance is not the first function type, perform S805.

S804: The first NFRF determines a first network slice type as a second network slice type, in the second PLMN, that corresponds to the first network slice type.

Perform S807 after S804.

S805: The first NFRF sends a network slice obtaining request to a policy management unit, where the network slice obtaining request includes a to-be-accessed first network slice type and the identifier of the second PLMN.

S806: The first NFRF receives a second network slice type, in the second PLMN, that is sent by the policy management unit and that corresponds to the first network slice type.

S807: The first NFRF determines the second network slice type as a to-be-accessed network slice identifier.

S808: The first NFRF generates an obtaining request based on the NF type of the to-be-accessed NF instance, the to-be-accessed network slice identifier, and an NF type of the first NF instance, where the obtaining request includes the NF type of the to-be-accessed NF instance, the to-be-accessed network slice identifier, and the NF type of the first NF instance.

S809: The first NFRF sends the obtaining request to a second NFRF corresponding to the identifier of the second PLMN.

S810: The second NFRF obtains a first NF type set corresponding to the to-be-accessed NF instance, where each NF type in the first NF type set is an NF type of an NF instance allowed to access the to-be-accessed NF instance.

S811: The second NFRF determines whether the first NF type set includes the NF type of the first NF instance.

If the first NF type set includes the NF type of the first NF instance, perform S814 to S821.

If the first NF type set does not include the NF type of the first NF instance, perform S812 and S813.

S812: The second NFRF sends limited access prompt information to the first NFRF.

S813: The first NFRF sends the limited access prompt information to the first NF instance.

S814: The second NFRF obtains, based on the obtaining request, instance information of a second NF instance corresponding to the NF type of the to-be-accessed NF instance and the to-be-accessed network slice identifier.

S815: The second NFRF sends the instance information of the second NF instance to the first NFRF.

S816: The first NFRF sends the instance information of the second NF instance to the first NF instance.

S817: The first NF instance determines whether a quantity of second NF instances is greater than 1.

If the quantity of second NF instances is greater than 1, perform S818.

If the quantity of second NF instances is not greater than 1, perform S819.

S818: The first NF instance selects a target second NF instance from a plurality of second NF instances.

S819: The first NF instance determines the second NF instance as a target second NF instance.

S820: The first NF instance sends an access request to the target second NF instance.

S821: The second NF instance sends an access response to the first NF instance.

In the embodiment shown in FIG. 8A and FIG. 8B, for descriptions of S801 to S807, refer to S701 to S707. Details are not described herein again.

In S808, the first NFRF generates the obtaining request based on the NF type of the to-be-accessed NF instance, the to-be-accessed network slice identifier, and the NF type of the first NF instance, where the obtaining request includes the NF type of the to-be-accessed NF instance, the to-be-accessed network slice identifier, and the NF type of the first NF instance, and sends the obtaining request to the second NFRF.

The second NFRF obtains the first NF type set corresponding to the to-be-accessed NF instance, and determines whether the first NF type set includes the NF type of the first NF instance.

If the first NF type set includes the NF type of the first NF instance, it indicates that the first NF instance has permission to access the to-be-accessed NF instance. Perform S814 to S821. For descriptions of S814 to S821, refer to S710 to S716. Details are not described herein again.

If the first NF type set does not include the NF type of the first NF instance, it indicates that the first NF instance has no permission to access the to-be-accessed NF instance. The second NFRF sends the limited access prompt information to the first NFRF, and the first NFRF sends the limited access prompt information to the first NF instance, to prompt that the first NF instance has no permission to access an NF instance corresponding to the NF type of the to-be-accessed NF instance.

It should be noted that, in the network control method shown in the embodiment of FIG. 8A and FIG. 8B, some steps may be replaced with steps having similar functions. This is not limited in the present application.

In the embodiment shown in FIG. 8A and FIG. 8B, before providing the instance information of the NF instance in the second PLMN for the first NF instance, the second NFRF first verifies whether the first NF instance has access permission; and when determining that the first NF instance has the access permission, provides the instance information of the NF instance in the second PLMN for the first NF instance, thereby improving access security of NF instances across PLMNs.

It should be noted that, based on any one of the foregoing embodiments, when sending the obtaining request to the second NFRF, the first NFRF may also add the NF type of the first NF instance and the NF type of the to-be-accessed NF instance (excluding the to-be-accessed network slice identifier) to the obtaining request, such that the second NFRF obtains the first network slice type of the first network slice to which the first NF instance belongs, requests the policy management unit for the second network slice type, in the second PLMN, that corresponds to the first network slice type, and determines the second network slice type as the to-be-accessed network slice identifier. A process in which the second NFRF requests the policy management unit for the second network slice type is the same as a process in which the first NFRF requests the policy management unit for the second network slice type. Details are not described herein again.

Figure 9:
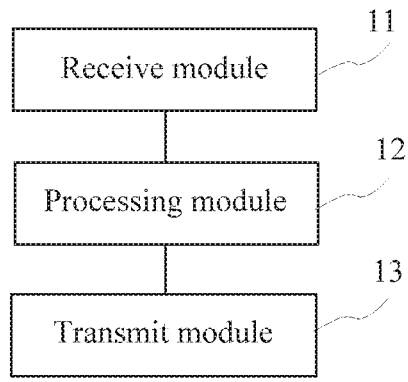
FIG. 9 is a schematic structural diagram of a network access control apparatus according to an embodiment of the present application.

FIG. 9 is a schematic structural diagram of a network access control apparatus according to an embodiment of the present application. The network access control apparatus is applied to a first NFRF in a first PLMN. Referring to FIG. 9, the apparatus includes a receive module 11, a processing module 12, and a transmit module 13.

The receive module 11 is configured to receive a discovery request sent by a first network function NF instance, where the discovery request includes an identifier of a second PLMN and an NF type of a to-be-accessed NF instance.

The processing module 12 is configured to obtain a to-be-accessed network slice identifier.

The transmit module 13 is configured to send an obtaining request to a second NFRF corresponding to the identifier of the second PLMN, where the obtaining request includes the NF type of the to-be-accessed NF instance and the to-be-accessed network slice identifier.

The receive module 11 is configured to receive instance information of a second NF instance corresponding to the NF type of the to-be-accessed NF instance and the to-be-accessed network slice identifier that are sent by the second NFRF.

The transmit module 13 is configured to send the instance information to the first NF instance.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

In a possible implementation, the to-be-accessed network slice identifier is a type of the to-be-accessed network slice. Alternatively, the to-be-accessed network slice identifier is a combination of a type of the to-be-accessed network slice and a tenant identifier.

In another possible implementation, the discovery request includes the to-be-accessed network slice identifier, and correspondingly, the processing module 12 is configured to obtain the to-be-accessed network slice identifier from the discovery request.

In another possible implementation, the processing module 12 is configured to obtain a function type corresponding to the first NF instance, and determine the to-be-accessed network slice identifier based on the function type corresponding to the first NF instance.

In another possible implementation, the processing module 12 is configured to obtain a first network slice type of a first network slice to which the first NF instance belongs, determine, based on a function type corresponding to the first NF instance, a second network slice type, in the second PLMN, that corresponds to the first network slice type, and determine the second network slice type as the to-be-accessed network slice identifier.

In another possible implementation, the processing module 12 is configured such that if the function type corresponding to the first NF instance is a first function type, the processing module 12 determines the first network slice type of the first network slice to which the first NF instance belongs as the second network slice type, where a slice type of a network function corresponding to the first function type is the same in all PLMNs. If the function type corresponding to the first NF instance is a second function type, the processing module 12 requests a policy management unit for the second network slice type, where a slice type of a network function corresponding to the second function type is different in different PLMNs.

In another possible implementation, the transmit module 13 is further configured to send a slice type obtaining request to the policy management unit, where the network slice obtaining request includes the first network slice type and the identifier of the second PLMN, and where the receive module 11 is further configured to receive the second network slice type, in the second PLMN, that is sent by the policy management unit and that corresponds to the first network slice type.

In another possible implementation, the instance information includes an address of the second NF instance, and correspondingly, the transmit module 13 is configured to send the instance information to the first NF instance, such that the first NF instance accesses the second NF instance based on the address of the second NF instance in the instance information.

In another possible implementation, a quantity of second NF instances corresponding to the NF type of the to-be-accessed NF instance is greater than 1, and correspondingly, the transmit module 13 is configured to send instance information of the second NF instances to the first NF instance, such that the first NF instance determines a target second NF instance in the second NF instances, and accesses the target second NF instance based on an address of the target second NF instance.

In another possible implementation, the instance information includes load information of the second NF instances, such that the first NF instance determines the target second NF instance in a plurality of second NF instances based on the load information of the second NF instances, and accesses the target second NF instance based on the address of the target second NF instance.

In another possible implementation, the method further includes the receive module 11 receiving an NF registration request, where the NF registration request includes instance information of a to-be-registered NF instance and slice information of a network slice to which the to-be-registered NF instance belongs, and the processing module generating instance information of the to-be-registered NF instance based on the instance information of the to-be-registered NF instance and the slice information of the network slice to which the to-be-registered NF instance belongs.

In another possible implementation, the instance information of the to-be-registered NF instance includes at least one of an identifier of the to-be-registered NF instance, an NF type of the to-be-registered NF instance, or an address of the to-be-registered NF instance, where the slice information of the target network slice includes at least one of an identifier of the target network slice or a type of the target network slice.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

Figure 10:
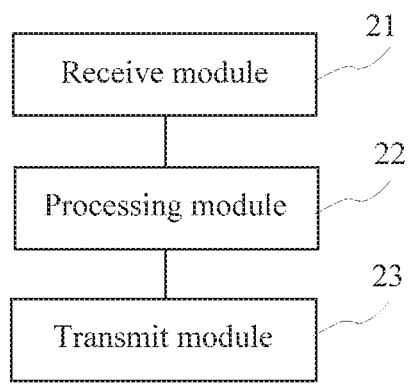
FIG. 10 is a schematic structural diagram of another network access control apparatus according to an embodiment of the present application.

FIG. 10 is a schematic structural diagram of another network access control apparatus according to an embodiment of the present application. The network access control apparatus is applied to a second NFRF in a second PLMN. Referring to FIG. 10, the apparatus includes a receive module 21, a processing module 22, and a transmit module 23.

The receive module 21 is configured to receive an obtaining request sent by a first NFRF, where the obtaining request includes an NF type of a to-be-accessed network function NF instance and a to-be-accessed network slice identifier.

The processing module 22 is configured to obtain, based on the obtaining request, instance information of a second NF instance corresponding to the NF type of the to-be-accessed NF instance and the to-be-accessed network slice identifier.

The transmit module 23 is configured to send the instance information of the second NF instance to the first NFRF.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

In a possible implementation, the processing module 22 is configured to obtain an address and load information of the second NF instance corresponding to the NF type of the to-be-accessed NF instance and the to-be-accessed network slice identifier.

In another possible implementation, the processing module 22 is further configured to obtain a quantity of second NF instances corresponding to the NF type of the to-be-accessed NF instance and the to-be-accessed network slice identifiered network slice identifier before the processing module 22 obtains the address and load information of the second NF instance corresponding to the NF type of the to-be-accessed NF instance and the to-be-accessed network slice identifier. If the quantity of second NF instances is greater than 1, the processing module 22 is configured to perform the step of obtaining an address and load information of the second NF instance corresponding to the NF type of the to-be-accessed NF instance and the to-be-accessed network slice identifier.

In another possible implementation, the obtaining request further includes the NF type of the first NF instance, and correspondingly, the processing module 22 is further configured to obtain a first NF type set corresponding to the to-be-accessed NF instance before the processing module 22 obtains, based on the obtaining request, the instance information of the second NF instance corresponding to the NF type of the to-be-accessed NF instance and the to-be-accessed network slice identifier, where each NF type in the first NF type set is an NF type of an NF instance allowed to access the to-be-accessed NF instance. If the first NF type set includes the NF type of the first NF instance, the processing module 12 is configured to perform the obtaining instance information of a second NF instance corresponding to the NF type of the to-be-accessed NF instance and the to-be-accessed network slice identifier.

In another possible implementation, the transmit module 23 is further configured to: if it is determined that the first NF type set does not include the NF type of the first NF instance, send limited access prompt information to the first NFRF, such that the first NFRF sends the limited access prompt information to the first NF instance.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

Figure 11:
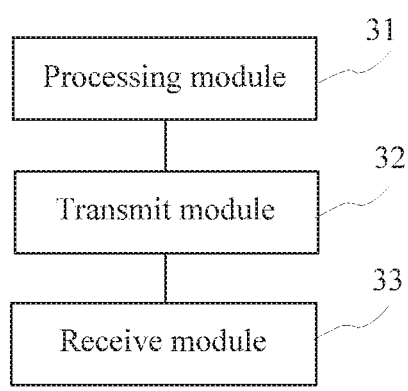
FIG. 11 is a schematic structural diagram of still another network access control apparatus according to an embodiment of the present application.

FIG. 11 is a schematic structural diagram of still another network access control apparatus according to an embodiment of the present application. The network access control apparatus is applied to a first NF instance. Referring to FIG. 11, the apparatus includes a processing module 31, a transmit module 32, and a receive module 33.

The processing module 31 is configured to obtain an NF type of a to-be-accessed NF instance and a to-be-accessed network slice identifier of a network slice to which the to-be-accessed NF instance belongs.

The transmit module 32 is configured to send a discovery request to a first network function management module NFRF, where the sending request includes an identifier of a second PLMN, the NF type of the to-be-accessed NF instance, and the to-be-accessed network slice identifier, such that the first NFRF requests a second NFRF in the second PLMN for instance information of a second NF instance corresponding to the NF type of the to-be-accessed NF instance and the to-be-accessed network slice identifier.

The receive module 33 is configured to receive the instance information of the second NF instance sent by the first NFRF.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

In a possible implementation, the processing module 31 is configured to obtain a first network slice type of a first network slice to which the first NF instance belongs, determine, based on a function type corresponding to the first NF instance, a second network slice type, in the second PLMN, that corresponds to the first network slice type, and determine the second network slice type as the to-be-accessed network slice identifier.

In another possible implementation, the processing module 31 is configured such that if the function type corresponding to the first NF instance is a first function type, the processing model 31 determines the first network slice type of the first network slice to which the first NF instance belongs as the second network slice type, where a slice type of a network function corresponding to the first function type is the same in all PLMNs. If the function type corresponding to the first NF instance is a second function type, the processing model 31 requests a policy management unit for the second network slice type, where a slice type of a network function corresponding to the second function type is different in different PLMNs.

In another possible implementation, the transmit module 32 is further configured to send a slice type obtaining request to the policy management unit, where the network slice obtaining request includes the first network slice type and the identifier of the second PLMN, where the receive module 33 is further configured to receive the second network slice type, in the second PLMN, that is sent by the policy management unit and that corresponds to the first network slice type.

The network access control apparatus shown in this embodiment of the present application may perform the technical solutions shown in the foregoing method embodiments. An implementation principle and a beneficial effect of the apparatus are similar to those of the foregoing method embodiments. Details are not described herein again.

Figure 12:
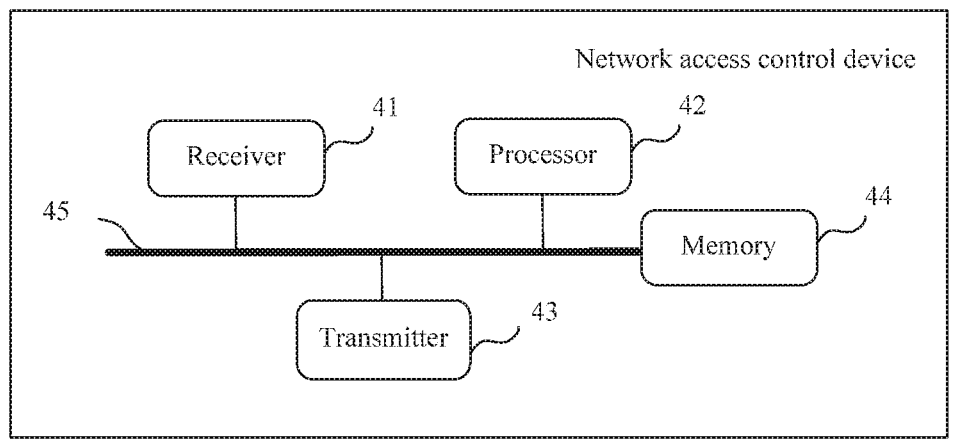
FIG. 12 is a schematic structural diagram of a network access control device according to an embodiment of the present application.

FIG. 12 is a schematic structural diagram of a network access control device according to an embodiment of the present application. The network access control device is applied to a first NFRF in a first PLMN. Referring to FIG. 12, the device includes a receiver 41, a processor 42, a transmitter 43, a memory 44, and a communications bus 45. The memory 44 is configured to store a program, the communications bus 45 is configured to implement a communications connection between elements, and the processor 42 may read the program in the memory 44 and perform a corresponding operation.

The receiver 41 is configured to receive a discovery request sent by a first network function NF instance, where the discovery request includes an identifier of a second PLMN and an NF type of a to-be-accessed NF instance.

The processor 42 is configured to obtain a to-be-accessed network slice identifier.

The transmitter 43 is configured to send an obtaining request to a second NFRF corresponding to the identifier of the second PLMN, where the obtaining request includes the NF type of the to-be-accessed NF instance and the to-be-accessed network slice identifier.

The receiver 41 is configured to receive instance information of a second NF instance corresponding to the NF type of the to-be-accessed NF instance and the to-be-accessed network slice identifier that are sent by the second NFRF.

The transmitter 43 is configured to send the instance information to the first NF instance.

The network access control device shown in this embodiment of the present application may perform the technical solutions shown in the foregoing method embodiments. An implementation principle and a beneficial effect of the device are similar to those of the foregoing method embodiments. Details are not described herein again.

In a possible implementation, the to-be-accessed network slice identifier is a type of the to-be-accessed network slice, or the to-be-accessed network slice identifier is a combination of a type of the to-be-accessed network slice and a tenant identifier.

In another possible implementation, the discovery request includes the to-be-accessed network slice identifier, and correspondingly, the processor 42 is configured to obtain the to-be-accessed network slice identifier from the discovery request.

In another possible implementation, the processor 42 is configured to obtain a function type corresponding to the first NF instance, and determine the to-be-accessed network slice identifier based on the function type corresponding to the first NF instance.

In another possible implementation, the processor 42 is configured to obtain a first network slice type of a first network slice to which the first NF instance belongs, determine, based on a function type corresponding to the first NF instance, a second network slice type, in the second PLMN, that corresponds to the first network slice type, and determine the second network slice type as the to-be-accessed network slice identifier.

In another possible implementation, the processor 42 is configured such that if the function type corresponding to the first NF instance is a first function type, the processor 42 determines the first network slice type of the first network slice to which the first NF instance belongs as the second network slice type, where a slice type of a network function corresponding to the first function type is the same in all PLMNs. If the function type corresponding to the first NF instance is a second function type, the processor 42 requests a policy management unit for the second network slice type, where a slice type of a network function corresponding to the second function type is different in different PLMNs.

In another possible implementation, the transmitter 43 is further configured to send a slice type obtaining request to the policy management unit, where the network slice obtaining request includes the first network slice type and the identifier of the second PLMN. Additionally, the receiver 41 is further configured to receive the second network slice type, in the second PLMN, that is sent by the policy management unit and that corresponds to the first network slice type.

In another possible implementation, the instance information includes an address of the second NF instance, and correspondingly, the transmitter 43 is configured to send the instance information to the first NF instance, such that the first NF instance accesses the second NF instance based on the address of the second NF instance in the instance information.

In another possible implementation, a quantity of second NF instances corresponding to the NF type of the to-be-accessed NF instance is greater than 1, and correspondingly, the transmitter 43 is configured to send instance information of the second NF instances to the first NF instance, such that the first NF instance determines a target second NF instance in the second NF instances, and accesses the target second NF instance based on an address of the target second NF instance.

In another possible implementation, the instance information includes load information of the second NF instances, such that the first NF instance determines the target second NF instance in a plurality of second NF instances based on the load information of the second NF instances, and accesses the target second NF instance based on the address of the target second NF instance.

In another possible implementation, the method further includes the receiver 41 receiving an NF registration request, where the NF registration request includes instance information of a to-be-registered NF instance and slice information of a network slice to which the to-be-registered NF instance belongs; and the processor 42 generating instance information of the to-be-registered NF instance based on the instance information of the to-be-registered NF instance and the slice information of the network slice to which the to-be-registered NF instance belongs.

In another possible implementation, the instance information of the to-be-registered NF instance includes at least one of an identifier of the to-be-registered NF instance, an NF type of the to-be-registered NF instance, or an address of the to-be-registered NF instance, and the slice information of the target network slice includes at least one of an identifier of the target network slice or a type of the target network slice.

The network access control device shown in this embodiment of the present application may perform the technical solutions shown in the foregoing method embodiments. An implementation principle and a beneficial effect of the device are similar to those of the foregoing method embodiments. Details are not described herein again.

Figure 13:
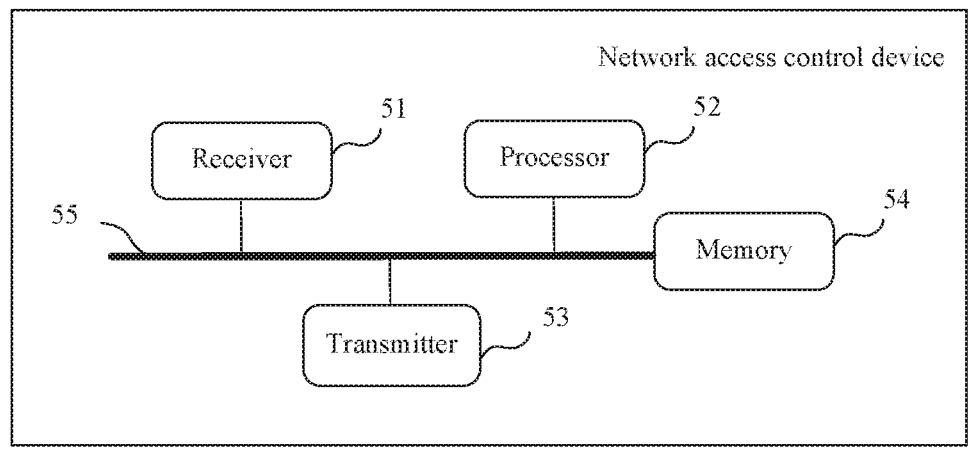
FIG. 13 is a schematic structural diagram of another network access control device according to an embodiment of the present application.

FIG. 13 is a schematic structural diagram of another network access control device according to an embodiment of the present application. The network access control device is applied to a second NFRF in a second PLMN. Referring to FIG. 13, the device includes a receiver 51, a processor 52, a transmitter 53, a memory 54, and a communications bus 55. The memory 54 is configured to store a program, the communications bus 55 is configured to implement a communications connection between elements, and the processor 52 may read the program in the memory 54 and perform a corresponding operation.

The receiver 51 is configured to receive an obtaining request sent by a first NFRF, where the obtaining request includes an NF type of a to-be-accessed network function NF instance and a to-be-accessed network slice identifier.

The processor 52 is configured to obtain, based on the obtaining request, instance information of a second NF instance corresponding to the NF type of the to-be-accessed NF instance and the to-be-accessed network slice identifier.

The transmitter 53 is configured to send the instance information of the second NF instance to the first NFRF.

The network access control device shown in this embodiment of the present application may perform the technical solutions shown in the foregoing method embodiments. An implementation principle and a beneficial effect of the device are similar to those of the foregoing method embodiments. Details are not described herein again.

In a possible implementation, the processor 52 is configured to obtain an address and load information of the second NF instance corresponding to the NF type of the to-be-accessed NF instance and the to-be-accessed network slice identifier.

In another possible implementation, the processor 52 is further configured to obtain a quantity of second NF instances corresponding to the NF type of the to-be-accessed NF instance and the to-be-accessed network slice identifiered network slice identifier before the processor 52 obtains the address and load information of the second NF instance corresponding to the NF type of the to-be-accessed NF instance and the to-be-accessed network slice identifier. If the quantity of second NF instances is greater than 1, the processor 52 is configured to perform the step of obtaining an address and load information of the second NF instance corresponding to the NF type of the to-be-accessed NF instance and the to-be-accessed network slice identifier.

In another possible implementation, the obtaining request further includes the NF type of the first NF instance, and correspondingly, the processor 52 is further configured to obtain a first NF type set corresponding to the to-be-accessed NF instance before the processor 52 obtains, based on the obtaining request, the instance information of the second NF instance corresponding to the NF type of the to-be-accessed NF instance and the to-be-accessed network slice identifier, where each NF type in the first NF type set is an NF type of an NF instance allowed to access the to-be-accessed NF instance. If the first NF type set includes the NF type of the first NF instance, the processor 52 is configured to perform the obtaining instance information of a second NF instance corresponding to the NF type of the to-be-accessed NF instance and the to-be-accessed network slice identifier.

In another possible implementation, the transmitter 53 is further configured to: if it is determined that the first NF type set does not include the NF type of the first NF instance, send limited access prompt information to the first NFRF, such that the first NFRF sends the limited access prompt information to the first NF instance.

The network access control device shown in this embodiment of the present application may perform the technical solutions shown in the foregoing method embodiments. An implementation principle and a beneficial effect of the device are similar to those of the foregoing method embodiments. Details are not described herein again.

Figure 14:
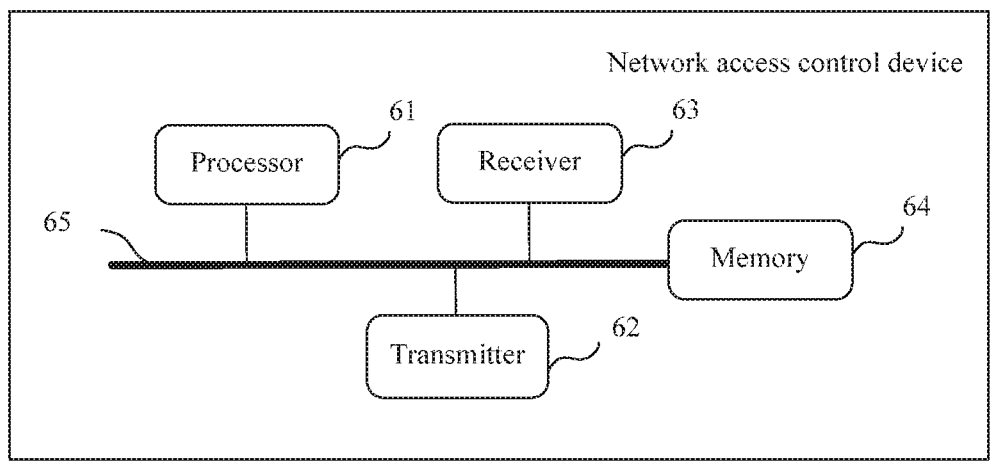
FIG. 14 is a schematic structural diagram of still another network access control device according to an embodiment of the present application.

FIG. 14 is a schematic structural diagram of still another network access control device according to an embodiment of the present application. The network access control device is applied to a first NF instance. Referring to FIG. 14, the device includes a processor 61, a transmitter 62, a receiver 63, a memory 64, and a communications bus 65. The memory 64 is configured to store a program, the communications bus 65 is configured to implement a communications connection between elements, and the processor 61 may read the program in the memory 64 and perform a corresponding operation.

The processor 61 is configured to obtain an NF type of a to-be-accessed NF instance and a to-be-accessed network slice identifier of a network slice to which the to-be-accessed NF instance belongs.

The transmitter 62 is configured to send a discovery request to a first network function management module NFRF, where the sending request includes an identifier of a second PLMN, the NF type of the to-be-accessed NF instance, and the to-be-accessed network slice identifier, such that the first NFRF requests a second NFRF in the second PLMN for instance information of a second NF instance corresponding to the NF type of the to-be-accessed NF instance and the to-be-accessed network slice identifier.

The receiver 63 is configured to receive the instance information of the second NF instance sent by the first NFRF.

The network access control device shown in this embodiment of the present application may perform the technical solutions shown in the foregoing method embodiments. An implementation principle and a beneficial effect of the device are similar to those of the foregoing method embodiments. Details are not described herein again.

In a possible implementation, the processor 61 is configured to obtain a first network slice type of a first network slice to which the first NF instance belongs, determine, based on a function type corresponding to the first NF instance, a second network slice type, in the second PLMN, that corresponds to the first network slice type, and determine the second network slice type as the to-be-accessed network slice identifier.

In another possible implementation, the processor 61 is configured such that if the function type corresponding to the first NF instance is a first function type, the processor 61 determines the first network slice type of the first network slice to which the first NF instance belongs as the second network slice type, where a slice type of a network function corresponding to the first function type is the same in all PLMNs. If the function type corresponding to the first NF instance is a second function type, the processor 61 requests a policy management unit for the second network slice type, where a slice type of a network function corresponding to the second function type is different in different PLMNs.

In another possible implementation, the transmitter 62 is further configured to send a slice type obtaining request to the policy management unit, where the network slice obtaining request includes the first network slice type and the identifier of the second PLMN. Additionally, the receiver 63 is configured to receive the second network slice type, in the second PLMN, that is sent by the policy management unit and that corresponds to the first network slice type.

The network access control device shown in this embodiment of the present application may perform the technical solutions shown in the foregoing method embodiments. An implementation principle and a beneficial effect of the device are similar to those of the foregoing method embodiments. Details are not described herein again.

An embodiment of the present application provides a network control system. The network control system includes the network access control devices shown in the embodiments of FIG. 12 to FIG. 14.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A network access control method applied to a first network function management module (NFRF) in a first public land mobile network (PLMN), the method comprising:
   receiving a discovery request from a first network function (NF) instance, wherein the discovery request comprises an identifier of a second PLMN and an NF type of a to-be-accessed NF instance;
   obtaining a to-be-accessed network slice identifier;
   sending an obtaining request to a second NFRF corresponding to the identifier of the second PLMN, wherein the obtaining request comprises the NF type of the to-be-accessed NF instance and the to-be-accessed network slice identifier;
   receiving instance information of a second NF instance corresponding to the NF type of the to-be-accessed NF instance and the to-be-accessed network slice identifier from the second NFRF; and
   sending the instance information of the second NF instance to the first NF instance.

2. The network access control method according to claim 1, wherein the to-be-accessed network slice identifier is one of a type of a to-be-accessed network slice or a combination of a type of the to-be-accessed network slice and a tenant identifier.

3. The network access control method according to claim 1, wherein the discovery request comprises the to-be-accessed network slice identifier, wherein obtaining the to-be-accessed network slice identifier comprises obtaining the to-be-accessed network slice identifier from the discovery request.

4. The network access control method according to claim 1, wherein obtaining the to-be-accessed network slice identifier that corresponds to the to-be-accessed NF instance comprises:
   obtaining a function type corresponding to the first NF instance; and
   determining the to-be-accessed network slice identifier based on the function type corresponding to the first NF instance.

5. The network access control method according to claim 4, further comprising:
   obtaining a first network slice type of a first network slice to which the first NF instance belongs; and
   determining the to-be-accessed network slice identifier based on the function type corresponding to the first NF instance by:
      determining, based on the function type corresponding to the first NF instance, a second network slice type, in the second PLMN, that corresponds to the first network slice type; and
      determining the second network slice type as the to-be-accessed network slice identifier.

6. The network access control method according to claim 5, wherein determining the second network slice type, in the second PLMN, that corresponds to the first network slice type based on the function type corresponding to the first NF instance comprises:
   determining the first network slice type of the first network slice to which the first NF instance belongs as the second network slice type when the function type corresponding to the first NF instance is a first function type, wherein a slice type of a network function corresponding to the first function type is identical in all PLMNs; or
   requesting a policy management unit for the second network slice type when the function type corresponding to the first NF instance is a second function type, wherein a slice type of a network function corresponding to the second function type is different in different PLMNs.

7. The network access control method according to claim 1, wherein a quantity of second NF instances corresponding to the NF type of the to-be-accessed NF instance is greater than 1.

8. The network access control method according to claim 1, further comprising:
   receiving an NF registration request, wherein the NF registration request comprises instance information of a to-be-registered NF instance and slice information of a network slice to which the to-be-registered NF instance belongs; and
   generating instance information of the to-be-registered NF instance based on the instance information of the to-be-registered NF instance and the slice information of the network slice to which the to-be-registered NF instance belongs,
   wherein the instance information of the to-be-registered NF instance comprises at least one of an identifier of the to-be-registered NF instance, an NF type of the to-be-registered NF instance, or an address of the to-be-registered NF instance, and wherein the slice information of the network slice comprises at least one of an identifier of the network slice or a type of the network slice.

9. A network access control method, comprising:
   obtaining, by a first network function (NF) instance located in a first public land mobile network (PLMN), an NF type of a to-be-accessed NF instance and a to-be-accessed network slice identifier of a network slice to which the to-be-accessed NF instance belongs;
   sending, by the first NF instance, a discovery request to a first NFRF in the first PLMN, wherein the discovery request comprises an identifier of a second PLMN, the NF type of the to-be-accessed NF instance, and the to-be-accessed network slice identifier;
   requesting, by the first NFRF, a second NFRF in the second PLMN for instance information of a second NF instance corresponding to the NF type of the to-be-accessed NF instance and the to-be-accessed network slice identifier;
   receiving, by the first NFRF, the instance information of the second NF instance from the second NFRF;
   sending, by the first NFRF, the instance information of the second NF instance to the first NF instance; and
   receiving, by the first NF instance, the instance information of the second NF instance from the first NFRF.

10. The network access control method according to claim 9, wherein obtaining the to-be-accessed network slice identifier of the network slice to which the to-be-accessed NF instance belongs comprises:
   obtaining, by the first NF instance, a first network slice type of a first network slice to which the first NF instance belongs;
   determining, by the first NF instance, based on a function type corresponding to the first NF instance, a second network slice type, in the second PLMN, that corresponds to the first network slice type; and determining, by the first NF instance, the second network slice type as the to-be-accessed network slice identifier.

11. The network access control method according to claim 9, wherein the to-be-accessed network slice identifier is one of a type of a to-be-accessed network slice, or a combination of a type of the to-be-accessed network slice and a tenant identifier.

12. The network access control method according to claim 9, wherein a quantity of second NF instances corresponding to the NF type of the to-be-accessed NF instance is greater than 1, and the method further comprises:

determining, by the first NF instance, a target second NF instance in the second NF instances; and accessing, by the first NF instance, the target second NF instance based on an address of the target second NF instance.

13. A network access control apparatus, comprising:
a memory storage comprising instructions; and
one or more processors in communication with the memory storage and configured to execute the instructions to:

receive a discovery request from a first network function (NF) instance, wherein the discovery request comprises an identifier of a public land mobile network (PLMN) and an NF type of a to-be-accessed NF instance;

obtain a to-be-accessed network slice identifier;

send an obtaining request to a network function management module (NFRF) corresponding to the identifier of the PLMN, wherein the obtaining request comprises the NF type of the to-be-accessed NF instance and the to-be-accessed network slice identifier;

receive instance information of a second NF instance corresponding to the NF type of the to-be-accessed NF instance and the to-be-accessed network slice identifier from the NFRF; and send the instance information of the second NF instance to the first NF instance.

14. The network access control apparatus according to claim 13, wherein the to-be-accessed network slice identifier is one of a type of a to-be-accessed network slice or a combination of a type of the to-be-accessed network slice and a tenant identifier.

15. The network access control apparatus according to claim 13, wherein a quantity of second NF instances corresponding to the NF type of the to-be-accessed NF instance is greater than 1.

16. The network access control apparatus according to claim 13, wherein the discovery request comprises the to-be-accessed network slice identifier, wherein the one or more processors execute the instructions to obtain the to-be-accessed network slice identifier from the discovery request.

17. A system, comprising:
a first network function management module (NFRF); and
a first network function (NF) instance in a first public land mobile network (PLMN), wherein the first NF is configured to:

obtain an NF type of a to-be-accessed NF instance and a to-be-accessed network slice identifier of a network slice to which the to-be-accessed NF instance belongs;

send a discovery request to the first NFRF, wherein the discovery request comprises an identifier of a second PLMN, the NF type of the to-be-accessed NF instance and the to-be-accessed network slice identifier; and receive instance information of a second NF instance corresponding to the NF type of the to-be-accessed NF instance and the to-be-accessed network slice identifier from the first NFRF, wherein the first NFRF is configured to:

receive the discovery request from the first NF instance;

send an obtaining request to a second NFRF corresponding to the identifier of the second PLMN, wherein the obtaining request comprises the NF type of the to-be-accessed NF instance and the to-be-accessed network slice identifier;

receive the instance information of the second NF instance from the second NFRF; and send the instance information of the second NF instance to the first NF instance.

18. The system according to claim 17, wherein the to-be-accessed network slice identifier is one of a type of a to-be-accessed network slice or a combination of a type of the to-be-accessed network slice and a tenant identifier.

19. The system according to claim 17, wherein a quantity of second NF instances corresponding to the NF type of the to-be-accessed NF instance is greater than 1.

20. The system according to claim 19, wherein the first NF instance is configured to determine a target second NF instance in a plurality of second NF instances, and access the target second NF instance based on an address of the target second NF instance.

* * * * *